United States Patent
El-Moussa et al.

(10) Patent No.: US 10,594,707 B2
(45) Date of Patent: Mar. 17, 2020

(54) LEARNED PROFILES FOR MALICIOUS ENCRYPTED NETWORK TRAFFIC IDENTIFICATION

(71) Applicant: British Telecommunications Public Limited Company, London (GB)

(72) Inventors: Fadi El-Moussa, London (GB); Ben Azvine, London (GB); George Kallos, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/559,346

(22) PCT Filed: Mar. 15, 2016

(86) PCT No.: PCT/EP2016/055506
§ 371 (c)(1),
(2) Date: Sep. 18, 2017

(87) PCT Pub. No.: WO2016/146609
PCT Pub. Date: Sep. 22, 2016

(65) Prior Publication Data
US 2018/0115567 A1    Apr. 26, 2018

(30) Foreign Application Priority Data

Mar. 17, 2015   (EP) .................................. 15275068

(51) Int. Cl.
*H04L 29/06* (2006.01)
*G06F 17/14* (2006.01)
*G06N 3/08* (2006.01)

(52) U.S. Cl.
CPC ........ *H04L 63/1416* (2013.01); *G06F 17/141* (2013.01); *G06N 3/08* (2013.01); *H04L 63/0428* (2013.01); *H04L 63/1441* (2013.01)

(58) Field of Classification Search
CPC . H04L 63/1416; H04L 63/14; H04L 63/0428; H04L 63/1441; G06N 3/08; G06F 17/141
See application file for complete search history.

(56) References Cited

U.S. PATENT DOCUMENTS 7,503,071 B1   3/2009   Hernacki
7,681,032 B2   3/2010   Peled et al.
(Continued)

FOREIGN PATENT DOCUMENTS

EP            3111612 B1    3/2018
WO    WO 2008/091785 A2    7/2008
(Continued)

OTHER PUBLICATIONS

Application and Filing Receipt for U.S. Appl. No. 15/857,163, filed Dec. 28, 2017, Inventor(s): El-Moussa et al.
(Continued)

*Primary Examiner* — Ayoub Alata
(74) *Attorney, Agent, or Firm* — Patterson Thuente Pedersen, P.A.

(57) ABSTRACT

The disclosure relates to detection of malicious network communications. In one embodiment, a method for identifying malicious encrypted network traffic associated with a malware software component communicating via a network is disclosed. The method includes training a neural network based on images for extracted portions of network traffic such that subsequent network traffic can be classified by the neural network to identify malicious network traffic associated with malware based on an image generated to represent a defined portion of the subsequent network traffic.

11 Claims, 20 Drawing Sheets

(56) References Cited

U.S. PATENT DOCUMENTS

| | | | |
|---|---|---|---|
| 8,341,724 B1 | 12/2012 | Burns et al. | |
| 8,953,584 B1 | 2/2015 | Wang | |
| 9,122,877 B2 | 9/2015 | Alperovitch | |
| 9,547,588 B1 | 1/2017 | Biederman et al. | |
| 9,818,136 B1 | 11/2017 | Hoffberg | |
| 2002/0069318 A1 | 6/2002 | Chow et al. | |
| 2006/0161984 A1* | 7/2006 | Phillips | G06F 21/564 726/24 |
| 2008/0294913 A1 | 11/2008 | Nakagoe et al. | |
| 2009/0034423 A1* | 2/2009 | Coon | H04L 69/16 370/244 |
| 2009/0094618 A1 | 4/2009 | Huntsman | |
| 2011/0067106 A1 | 3/2011 | Evans et al. | |
| 2011/0231935 A1 | 9/2011 | Gula et al. | |
| 2012/0082061 A1 | 4/2012 | Lysejko et al. | |
| 2012/0082104 A1 | 4/2012 | Lysejko et al. | |
| 2012/0210421 A1 | 8/2012 | Ormazabal et al. | |
| 2012/0290829 A1 | 11/2012 | Altman | |
| 2012/0331556 A1 | 12/2012 | Alperovitch et al. | |
| 2013/0073853 A1 | 3/2013 | Ford | |
| 2013/0097699 A1 | 4/2013 | Balupari et al. | |
| 2013/0262655 A1* | 10/2013 | Desch nes | H04L 63/0428 709/224 |
| 2013/0326494 A1 | 12/2013 | Nunez | |
| 2014/0115702 A1 | 4/2014 | Li et al. | |
| 2014/0157405 A1 | 6/2014 | Joll et al. | |
| 2014/0310394 A1 | 10/2014 | Wood et al. | |
| 2015/0052601 A1 | 2/2015 | White et al. | |
| 2015/0128263 A1 | 5/2015 | Raugas et al. | |
| 2015/0149739 A1 | 5/2015 | Seo et al. | |
| 2015/0304346 A1 | 10/2015 | Kim | |
| 2016/0366155 A1 | 12/2016 | El-Moussa et al. | |
| 2017/0013000 A1 | 1/2017 | El-Moussa et al. | |
| 2017/0142133 A1 | 5/2017 | Kallos | |
| 2017/0223032 A1 | 8/2017 | El-Moussa et al. | |
| 2018/0191751 A1 | 7/2018 | El-Moussa et al. | |

FOREIGN PATENT DOCUMENTS

| | | |
|---|---|---|
| WO | WO 2009/015422 A1 | 2/2009 |
| WO | WO 2015/128609 A1 | 9/2015 |
| WO | WO 2016/146610 A1 | 9/2016 |
| WO | WO 2017/108575 A1 | 6/2017 |
| WO | WO 2017/108576 A1 | 6/2017 |
| WO | WO 2017/109135 A1 | 6/2017 |

OTHER PUBLICATIONS

Application and Filing Receipt for U.S. Appl. No. 15/319,970, filed Dec. 19, 2016, Inventors: Kallos.
U.S. Appl. No. 15/120,996, filed Aug. 23, 2016, Inventors: El-Moussa et al.
U.S. Appl. No. 15/121,008, filed Aug. 23, 2016, Inventors: El-Moussa et al.
U.S. Appl. No. 15/121,015, filed Aug. 23, 2016, Inventors: El-Moussa et al.
U.S. Appl. No. 15/559,328, filed Sep. 18, 2017, Inventors: Azvine et al.
International Search Report, Application No. PCT/EP2016/055507 dated Jun. 2, 2016, 6 pages.
Written Opinion of the International Searching Authority for, Application No. PCT/EP2016/055507 dated Jun. 2, 2016, 7 pages.
International Preliminary Report on Patentability for, Application No. PCT/EP2016/055507 dated Sep. 19, 2017, 8 pages.
International Search Report, Application No. PCT/EP2016/055506 dated May 17, 2016, 4 pages.
Written Opinion of the International Searching Authority for, Application No. PCT/EP2016/055506 dated May 17, 2016, 5 pages.
International Preliminary Report on Patentability for, Application No. PCT/EP2016/055506 dated Sep. 19, 2017, 6 pages.
Peter Dorfinger et al: "Entropy Estimation for Real-Time Encrypted Traffic Identification (Short Paper)" In: "Field Programmable Logic and Application". Apr. 27, 2011 (Apr. 27, 2011). Springer Berlin Heidelberg. Berlin. Heidelberg. XP055127221. ISSN: 0302-9743 ISBN: 978-3-54-045234-8 vol. 6613. pp. 164-171. DOI: 10.1007/978-3-642-20305-3 14.
Laurent Bernaille et al: "Early Recognition of Encrypted Applications". Apr. 5, 2007 (Apr. 5, 2007). Passive and Active Network Measurement; [Lecture Notes in Computer Science; LNCS]. Springer Berlin Heidelberg. Berlin. Heidelberg. p. 165-175. XP019078570. ISBN: 978-3-540-71616-7 pp. 165-175.
International Search Report, Application No. PCT/GB2015/050446, dated Sep. 3, 2015, 4 pages.
Written Opinion of the Int'l Searching Authority, Application No. PCT/GB2015/050446, dated Sep. 3, 2015, 9 pages.
International Preliminary Report on Patentability, Application No. PCT/GB2015/050446, dated Sep. 6, 2016, 10 pages.
International Preliminary Report on Patentability, Application No. PCT/GB2015/050444, dated Sep. 6, 2016, 10 pages.
Felix Leder et al: "Proactive Botnet Countermeasures—An Offensive Approache", Proc. of 1st CCDCOE Conference on Cyber Warfare, Jun. 16, 2009 (Jun. 16, 2009), XP055129346, Tallinn, Estonia Retrieved from the Internet: http://www.ccdcoe.org/publications/virtualbattlefield/15_LEDER_Proactive_Coutnermeasures.pdf; 15 pages (retrieved on Feb. 15, 2018).
International Search Report, Application No. PCT/GB2015/050444, dated Sep. 3, 2015, 4 pages.
Written Opinion of the Int'l Searching Authority, Application No. PCT/GB2015/050444, dated Sep. 3, 2015, 9 pages.
International Search Report for corresponding International Application No. PCT/GB2015/050431 dated May 26, 2015; 4 pages.
Written Opinion for corresponding International Application No. PCT/GB2015/050431 dated May 26, 2015; 8 pages.
Common Vulnerability Scoring System, V3 Development Update, First.org, Inc., available at www.first.org/cvss); CVSS v3.0 User Guide (v1.5); 15 pages.
Frigault "Measuring Network Security Using Bayesian Network-Based Attack Graphs" (Marcel Frigault and Lingyu Wang, Jan. 2008, Published in: Computer Software and Applications, 2008. OI: 0.1109/COMPSAC.2008.88 •Source: IEEE Xplore); 88 pages.
"Service Name and Transport Protocol Port Number Registry" (Feb. 15, 2018, available from www.iana.org/assignments/service-names-port-numbers/service-names-port-numbers.txt); 411 pages (retrieved on Mar. 6, 2018).
Munoz-Gonzalez "Exact Inference Techniques for the Dynamic Analysis of Bayesian Attack Graphs" (Luis Munoz-Gonzalez, Daniel Sgandurra, Martin Barrere, and Emil Lupu, Oct. 2015); 14 pages.
Jean Goubault-Larrecq and Julien Olivain: "Detecting Subverted Cryptographic Protocols by Entropy Checking", Research Report LSV-06-13, Laboratoire Specification et Verification, Jun. 2006 (Jun. 2006), XP055216893, FR Retrieved from the Internet: URL: http://www.lsv.fr/Publis/RAPPORTS_LSV/PDF/rr-lsv-2006-13.pdf 21 pages (retrieved on Feb. 15, 2018).
Robert Lyda et al: "Using Entropy Analysis to Find Encryted and Packed Malware", Security & Privacy, IEEE, IEEE Service Center, Los Alamitos, CA, US, vol. 5, No. 2, Mar. 2007 (Mar. 2007), pp. 40-45, XP011175986, ISSN: 1540-7993 abstract p. 40, left hand column, line 1-p. 44, right-hand column, line 39 p. 45, paragraph Related work.
Zhang et al, "Detecting Encrypted Botnet Traffic"; Computer Communications Workshops; Computer Science Department, Colorado State University Fort Collins, United States; (Infocom Wkshps), 2013); 6 pages.
Haffner et al., "ACAS: Automated construction of application signatures," Proceeding of the 2005 ACM SIGCOMM Workshop on Mining Network Data, Minenet '05 (Aug. 22, 2005), New York, New York, US. 6 pages.
"Entropy", R.L. Dobrushin V.V. Prelov, Encyclopedia of Mathematics, URL: http://www.encyclopediaofmath.org/index.php?title=Entropy&oldid=15099; Springer, 2002, ISBN 1402006098; 2 pages (retrieved on Feb. 15, 2018).
Chen et al., "Spatial-Temporal Modeling of Malware Propagation in Networks", IEEE Transactions on Neural Networks, vol. 16, No. 5 Sep. 2005, 13 pages.

(56) References Cited

OTHER PUBLICATIONS

EP Application No. 16207655.8, filed Dec. 30, 2016, Inventor(s): El-Moussa et al.; 23 pages.
Braden, R.; Internet Protocol Suite RFC1122; Internet Engineering Task Force, Oct. 1989; "Requirements for Internet Hosts-Communication Layers", https://tools.ietf.org/html/rfc1122; 116 pages (retrieved on Feb. 15, 2018).
ITU-T H.323 Series H: Audiovisual and Multimedia Systems Infrastructure of audiovisual services—Systems and terminal equipment for audiovisual services. "Packed-based multimedia communications systems", Amendment 1: Use of Facility message to enable call transfer; dated Mar. 2013, 6 pages.
H.225 "Call signaling protocols and media stream packetization for packet-based multimedia communication systems" International Telecommunication Union, Dec. 2009 and Amendment 1 dated Mar. 2013, 6 pages.
International Telecommunication Union H.245 Series H: Audiovisual and Multimedia Systems Infrastructure of audiovisual services—Communication procedures "Control protocol for multimedia communication", May 2011, 348 pages.
Itu-T Telecommunication Standardization Sector of ITU; Series H.235.0 to H.235.7, International Telecommunication Union, Sep. 2005 and Jan. 2014, 296 pages.
Shannon "A Mathematical Theory of Communication" (C.E. Shannon, The Bell System Technical Journal, vol. 27, pp. 379-423, 623-656, July, Oct. 1948; 55 pages.
Itu-T H. 225.0 Dec. 2009 Series H: Audiovisual and Multimedia Systems Infrastructure of Audiovisual Services—Transmission Multiplexing and Synchrinication; "Call Signaling Protocols and Media Stream Packetization for Packet-Based Multimedia Communication Systems" 196 pages.
Bestuzhev, Dmitry, "Steganography or Encryption in Bankers?" Nov. 10, 2011; 3 pages (retrieved on Feb. 15, 2018). https://securelist.com/steganography-or-encryption-in-bankers-11/31650/.
Lall et al., "Data Streaming Algorithms for Estimating Entropy of Network Traffic," SIGMETRICS/Performance Jun. 26-30, 2006, Saint Malo, France. 12 pages.
International Telecommunication Union H.225/Q931 Amendment 1 (Dec. 2002) Series Q: Switching and Signaling Digital Subscriber Signaling System No. 1—Network Layer; ISDN User-Network Interface Layer 3 Specification for Basic Call Control; Amendment 1: Extensions for the support of digital multiplexing equipment; Printed Switzerland, Geneva 2003. 26 pages.
Davis, Tom; Guidance Software | Whitepaper; "Utilizing Entropy to Identify Undetected Malware"; Tom Davis, Product Manager, Cybersecurity Solutions; 2009; 11 pages.
International Preliminary Report on Patentability for corresponding International Application No. PCT/GB2015/050431 dated Sep. 6, 2016; 9 pages.
Application and Filing Receipt for U.S. Appl. No. 16/065,482, filed Jun. 22, 2018, Inventor(s): Kallos et al.
Application and Filing Receipt for U.S. Appl. No. 16/065,554, filed Jun. 22, 2018, Inventor(s): El-Moussa et al.
Application as filed for U.S. Appl. No. 16/065,603, filed Jun. 22, 2018, Inventor(s): El-Moussa et al.
Guiling Li—et al Fractal-based Algorithm for Anomaly Pattern Discovery on Time Series Stream Journal of Convergence Information Technology. vol. 6. No. 3. Mar. 31, 2011 (Mar. 31, 2011). pp. 181-187. XP055254814. KP ISSN: 1975-9320. DOI: 10.4156jcit.vol6.issue3.20.
Traina, et a.; "Fast Feature Selection Using Fractal Dimension"; Carnegie Mellon University Research Showcase @ CMU, Computer Science Department, School of Computer Science; Oct. 2000; Published: XV Simpósio Brasileiro de Banco de Dados, João Pessoa, Paraíba, Brasil, Anais; 16 pages.
Maxion et al., "Benchmarking anomaly-based detection systems", Proceeding International Conference on Dependable Systems and Networks. DSN 2000, dated Jun. 25-28, 2000, 8 pages.
Velarde-Alvarado et al., "Detecting anomalies in network traffic using the method of remaining element", IEEE Communications Letters, vol. 13, Issue: 6, Jun. 2009, 4 pages.

\* cited by examiner

FIG. *19a*
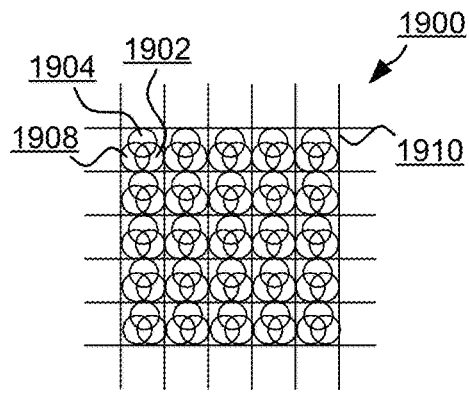
FIG. *19b*
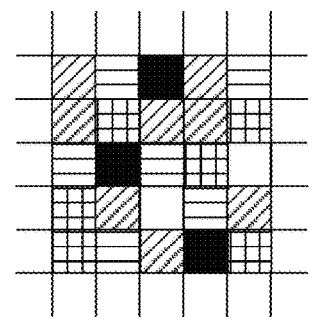
FIG. *20*
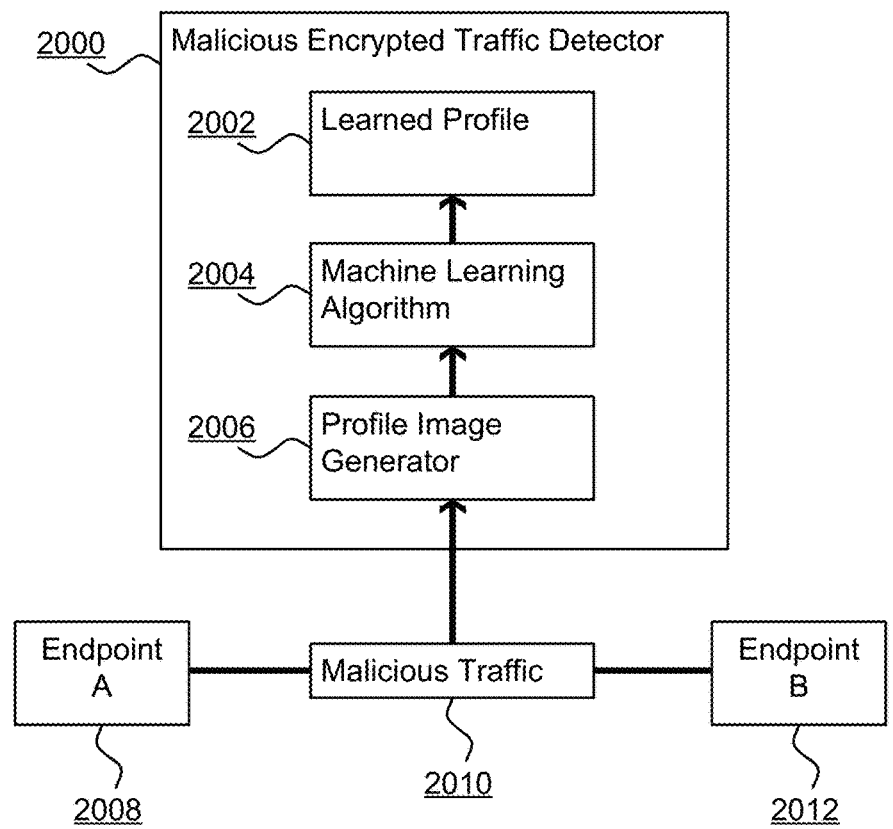

LEARNED PROFILES FOR MALICIOUS ENCRYPTED NETWORK TRAFFIC IDENTIFICATION

CROSS-REFERENCE TO RELATED APPLICATIONS

The present application is a National Phase entry of PCT Application No. PCT/EP2016/055506, filed on 15 Mar. 2016, which claims priority to EP Patent Application No. 15275068.3, filed on 17 Mar. 2015, which are hereby fully incorporated herein by reference.

TECHNICAL FIELD

The present disclosure relates to the detection of malicious network communications. In particular, the disclosure relates to improved malicious network traffic detection.

BACKGROUND

Malicious software, also known as computer contaminants or malware, is software that is intended to do direct or indirect harm in relation to one or more computer systems. Such harm can manifest as the disruption or prevention of the operation of all or part of a computer system, accessing private, sensitive, secure and/or secret data, software and/or resources of computing facilities, or the performance of illicit, illegal or fraudulent acts. Malware includes, inter alia, computer viruses, worms, botnets, trojans, spyware, adware, rootkits, keyloggers, dialers, malicious browser extensions or plugins and rogue security software.

Malware proliferation can occur in a number of ways. Malware can be communicated as part of an email such as an attachment or embedding. Alternatively malware can be disguised as, or embedded, appended or otherwise communicated with or within, genuine software. Some malware is able to propagate via storage devices such as removable, mobile or portable storage including memory cards, disk drives, memory sticks and the like, or via shared or network attached storage. Malware can also be communicated over computer network connections such as the internet via websites or other network facilities or resources. Malware can propagate by exploiting vulnerabilities in computer systems such as vulnerabilities in software or hardware components including software applications, browsers, operating systems, device drivers or networking, interface or storage hardware.

A vulnerability is a weakness in a computer system, such as a computer, operating system, network of connected computers or one or more software components such as applications. Such weaknesses can manifest as defects, errors or bugs in software code that present an exploitable security weakness. An example of such a weakness is a buffer-overrun vulnerability, in which, in one form, an interface designed to store data in an area of memory allows a caller to supply more data than will fit in the area of memory. The extra data can overwrite executable code stored in the memory and thus such a weakness can permit the storage of malicious executable code within an executable area of memory. An example of such malicious executable code is known as 'shellcode' which can be used to exploit a vulnerability by, for example, the execution, installation and/or reconfiguration of resources in a computer system. Such weaknesses, once exploited, can bootstrap a process of greater exploitation of a target system.

The effects of malware on the operation and/or security of a computer system lead to a need to identify malware in a computer system in order to implement protective and/or remedial measures. Malware propagated by, or communicating over, a network connection, such as the internet, by exploitation of a vulnerability in a target system can be particularly challenging to detect. Many systems monitor files stored or received in a file system with reference to a dictionary of malware "signatures". A signature can be a pattern of data associated with known malware. Such an approach requires the receipt of known malware and is susceptible to subtle changes in malware which may render the malware undetectable in view of the stored signatures. Other systems monitor behavior of software to identify suspicious behavior in order to detect potential malware. Such systems therefore detect malware infection after-the-event and are susceptible to changes in malware and malware devised specifically to minimize suspicious behavior such as malware designed to behave like genuine software.

An alternative approach to the detection of malware is to detect network traffic associated with malware propagated by, or communicating over, a network connection. Such network traffic can be considered malicious network traffic occurring as part of network communications received by, or occurring between, computer systems, such as traffic attributable to malware software installed, being installed or being communicated for installation on a computer system. Traditional malicious traffic detection mechanisms depend on techniques including network traffic interception and analysis or network connection summarization which can determine key characteristics of a network connection such as source and destination addresses, source and destination ports and a protocol (known as a traffic characterizing 5-tuple). Such facilities are provided by technologies such as NetFlow (Cisco) or Yet Another Flowmeter (YAF). With these approaches, detection of malicious communication depends on an analysis of network traffic (or a summarization of traffic) to identify known characteristics of malicious traffic, such as known server addresses, protocols and/or port combinations. Such approaches are of limited effectiveness since it is not always possible to distinguish malicious traffic from non-malicious traffic without also referring to the contents of packets of network traffic by deep packet inspection (DPI) using tools such as BotHunter. BotHunter uses DPI to search for specific patterns in network traffic to detect executable downloads or signature strings associated with known malware.

However, DPI is ineffective where malicious network traffic is encrypted. The paper "Detecting Encrypted Botnet Traffic" (Zhang et al., Computer Communications Workshops (INFOCOM WKSHPS), 2013) acknowledges how detection systems such as BotHunter suffer significantly in the presence of encrypted traffic with detection rates reduced by almost 50%. Zhang et al. describes an approach using BotHunter to detect encrypted malicious traffic. The approach of Zhang et al. operates on the premise that the presence of at least one high entropy flow along with other features that BotHunter detects is a reliable detector of encrypted malicious traffic. In information theory, entropy is a measure of a degree of indeterminacy of a random variable ("Entropy", R. L. Dobrushin V. V. Prelov, Encyclopedia of Mathematics, Springer, 2002, ISBN 1402006098). The theoretical basis for entropy calculation and the entropy of an information source is defined in detail in "A Mathematical Theory of Communication" (C. E. Shannon, The Bell System Technical Journal, Vol. 27, pp. 379-423, 623-656, July, October, 1948) and derives from a measure of entropy as defined in statistical mechanics. Zhang describes estimating a measure of entropy for packets in a network communication. Estimates of entropy for a communication exceeding a threshold are identified as 'high entropy' and an identification of a high entropy flow contributes to a detection of encrypted malicious traffic.

Zhang is premised on the detection of high entropy flows as an indicator of malicious network traffic. Encrypted network traffic also arises as part of non-malicious applications such as traffic from genuine and/or authorized software applications being encrypted for security purposes. It is therefore problematic to detect and respond to high entropy flows where non-malicious traffic may be falsely identified as potentially malicious.

The paper "Detecting Subverted Cryptographic Protocols by Entropy Checking" (J. Olivain and J. Goubault-Larrecq, 2006) describes an approach to detecting attacks based on computing entropy for a flow. The approach of Olivain et al. is directed to the detection of unscrambled traffic over cryptographic protocols as a way of detecting potentially malicious traffic. In particular, Olivain et al. observe how a measure of entropy for encrypted network traffic will tend towards the entropy of a random source such that, where network traffic consists of characters as bytes from an alphabet of 256 bytes, the entropy of encrypted network traffic tends towards 8 bits per byte. On this basis, Olivain et al. propose an approach to malicious traffic detection based on ranges of acceptable measures of entropy tending towards the entropy of a random source such that traffic that does not tend consistently in this way is identified as being unscrambled and malicious. Olivain et al. acknowledge the considerable drawback of their technique that it can be countered by malicious traffic that is itself encrypted. This is because encrypted malicious traffic will also exhibit entropy tending towards the entropy of a random source and so becomes indistinguishable from non-malicious encrypted traffic.

Bestuzhev highlights how malware can be communicated in encrypted form causing existing automatic malware detection systems to function incorrectly (Bestuzhev, 2010, www.securelist.com/en/blog/208193235/Steganography_or_encryption_in_bankers, retrieved February 2014). Such encrypted malware would also fail to be detected by the approach of Olivain et al. which relies on the communication of unscrambled (e.g. unencrypted) traffic for detection.

Thus there is a need to address the considerable disadvantages of the known techniques to provide for the detection of encrypted malicious traffic.

SUMMARY

The present disclosure accordingly provides, in a first aspect, a method for identifying malicious encrypted network traffic associated with a malware software component communicating via a network, the method comprising: defining, for the malware, a portion of network traffic including a plurality of contiguous bytes occurring at a predefined offset in a network communication of the malware; extracting the defined portion of network traffic for each of a plurality of disparate network connections for the malware; evaluating a metric for each byte in each extracted portion; representing each extracted portion in a matrix data structure as an image of pixels wherein each pixel corresponds to a byte of the extracted portion; training a neural network based on the images for the extracted portions such that subsequent network traffic can be classified by the neural network to identify malicious network traffic associated with the malware based on an image generated to represent the defined portion of the subsequent network traffic.

In some embodiments, the metric is a Fourier transform coefficient.

Alternatively the metric is a measure of entropy as a measure of a degree of indeterminacy of bytes.

In some embodiments, the defined portion of network traffic is a subset of the network traffic subsequent to a transport protocol handshake and up to a predetermined endpoint.

In some embodiments, the predetermined endpoint is selected to correspond to an end of an application protocol connection setup portion of network traffic.

In some embodiments, the method further comprises, in response to the identification of malicious network traffic, triggering a protective component to protect an endpoint of the network connection from the malicious encrypted network traffic.

In some embodiments, the protective component is operable to undertake one or more of: terminating the network connection; initiate a scan for malware installed at an endpoint computer system; and adapt a level of security of an endpoint computer system or network connection.

In some embodiments, the portion of network traffic is defined such that an evaluated set of Fourier transform coefficients for the portion of encrypted malicious network traffic for a malware network communication substantially distinguishes the malware network communication from non-malware network communication.

In some embodiments, the network connection is provided via a transmission control protocol (TCP) connection, and the portion is defined to be a continuous subset of traffic occurring over the network connection subsequent to a TCP handshake portion and up to a point in a flow of network traffic on the network connection where the traffic is substantially all encrypted.

The present disclosure accordingly provides, in a second aspect, a system for identifying malicious encrypted network traffic associated with a malware software component communicating via a network, the system comprising a memory and a processor wherein the processor is adapted to: for defining, for the malware, a portion of network traffic including a plurality of contiguous bytes occurring at a predefined offset in a network communication of the malware; extracting the defined portion of network traffic for each of a plurality of disparate network connections for the malware; evaluating a metric for each byte in each extracted portion; representing each extracted portion in a matrix data structure as an image of pixels wherein each pixel corresponds to a byte of the extracted portion; training a neural network based on the images for the extracted portions such that subsequent network traffic can be classified by the neural network to identify malicious network traffic associated with the malware based on an image generated to represent the defined portion of the subsequent network traffic.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 19a illustrates an exemplary profile image for each of a series of bytes in a connection setup portion of malicious network traffic in accordance with an embodiment of the present disclosure.

FIG. 19b illustrates an exemplary profile image showing different color components for each of a series of bytes in a connection setup portion of malicious network traffic in accordance with an embodiment of the present disclosure.

FIG. 20 is a component diagram of a malicious encrypted traffic detector in accordance with an embodiment of the present disclosure.

DETAILED DESCRIPTION

Figure 1:
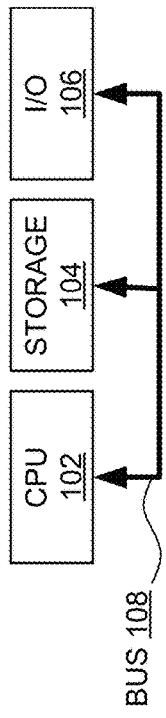
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
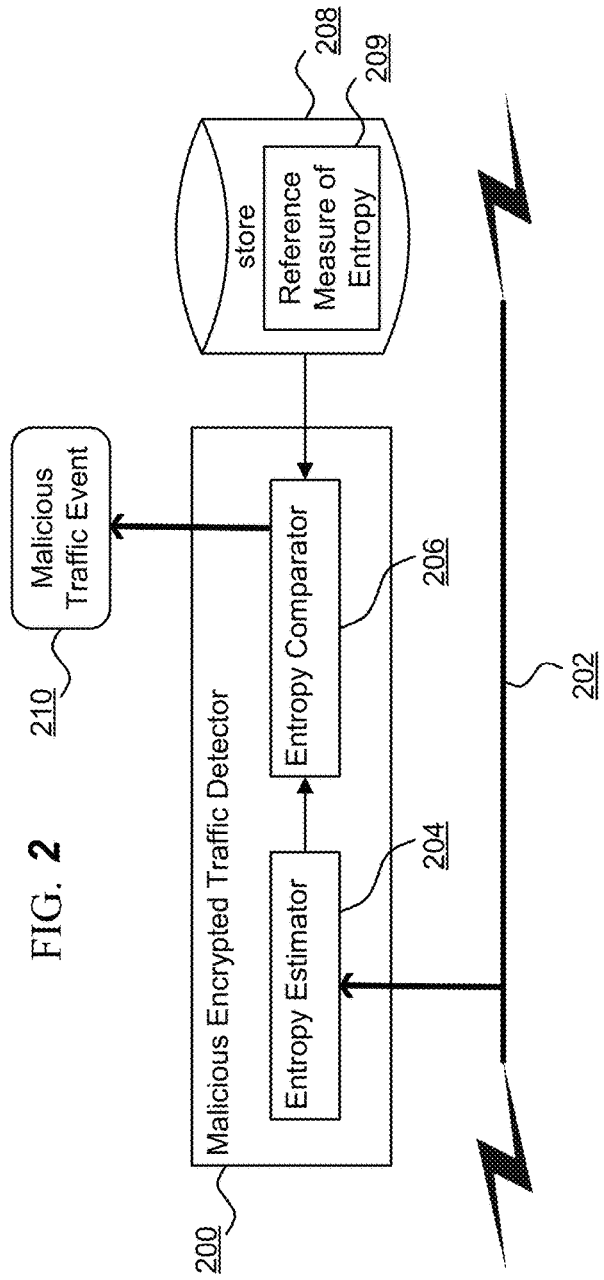
FIG. 2 is a component diagram of a malicious encrypted traffic detector in accordance with an embodiment of the present disclosure.

FIG. 2 is a component diagram of a malicious encrypted traffic detector 200 in accordance with an embodiment of the present disclosure. The detector 200 is a software, hardware or firmware component for monitoring network traffic communicated via a computer network 202 and for generating a malicious traffic event 210 on detection of malicious traffic. The network 202 is a wired or wireless network suitable for the communication of information such as data as network traffic between or within computer systems. Such computer systems can include network connected devices having means to transmit and/or receive data via such a computer network 202 such as, inter alia, pervasive devices, smart-phones, embedded logic in devices, appliances, vehicles or other articles, networks of computer systems, mainframe, mini, desktop, portable or cloud-based computer systems, virtualized or emulated systems and the like. Network traffic is communicated via the network connection 202 between network endpoints such as computer systems. Each communication between endpoints is part of a network connection, such as a Transmission Control Protocol (TCP) connection in the Internet Protocol Suite. For example, a network connection can be characterized by an address of a source network endpoint, an address of a destination network endpoint, source and destination ports for the communication and a type of communication protocol employed.

The detector 200 can be implemented in a network appliance such as a router, switch, firewall, network attached storage, multiplexor, transceiver or the like. Alternatively, the detector 200 can be a standalone device operable with the network 202. In a further alternative, the detector 200 can be provided as a software, hardware or firmware component of a network connected computer system such as a computer system for protection from malicious network traffic and/or malware. For example, the detector 200 can be implemented as part of an intrusion detection system, firewall, operating system, virus detection system, malware detection system or the like.

The detector includes an entropy estimator 204 and an entropy comparator 206 as software, hardware or firmware components. The entropy estimator 204 is operable to evaluate an estimated measure of entropy for a portion of network traffic communicated over a network connection via the computer network 202. The estimated measure of entropy is calculated as a measure of a degree of indeterminacy of information communicated via the network connection, such as an estimated measure of Shannon entropy. For example, the estimated measure of entropy $H_N$ can be evaluated for a portion of network traffic by:

$$H_N = -\frac{1}{W}\sum_{i=1}^{W} n_i \log_2\left(\frac{n_i}{W}\right)$$

where W is a size of the portion of network traffic (in bytes) and $n_i$ is a number of occurrences of byte of type i in the portion. The network traffic will be communicated as a stream of traffic, and the bytes in the portion for which entropy is evaluated will thus be received sequentially, in packets, blocks or other streamed units or means. Accordingly, in an embodiment, the estimated measure of entropy for the portion of network traffic is evaluated using a streaming algorithm such as is described by Lall et al. in "Data Streaming Algorithms for Estimating Entropy of Network Traffic" (Lail et al., SIGMETRICS/Performance 2006). Such a streaming algorithm provides an unbiased estimate of entropy with a performance that can accommodate real-time receipt of streamed network traffic. This is achieved by selecting a number of random locations in the stream based on a predetermined level of relative error and probability. Counts are maintained of bytes received in the stream occurring at the random locations and entropy estimates are evaluated on the basis of the counts. The estimates are averaged and a median is used as a basis of an estimated measure of entropy. Thus, employing the approach of Lall et al., an estimated measure of entropy for a portion of network traffic occurring in a network connection can be generated efficiently as the traffic is received.

The portion of network traffic is selected as a continuous subset of the network traffic as a window of network traffic substantially corresponding to an application protocol connection setup. That is, the portion of network traffic substantially corresponds to a portion of the network traffic involved in the formation of a connection for an application network protocol between two application endpoints communicating via the network 202, as will be described in detail below.

The entropy comparator 206 is operable to receive an estimated measure of entropy from the estimator 204 for comparison with a reference measure of entropy 209 in a data store 208. The data store is any suitable data storage mechanism for the storage of the reference measure of entropy 209, such as a data structure, memory area, file, database or the like. While the store 208 is illustrated as being external to the detector 200 it will be apparent to those skilled in the art that the store could alternatively constitute part of the detector 200.

The reference measure of entropy 209 is a measure of entropy for a portion of network traffic of a malicious encrypted network connection. The reference measure of entropy 209 is predetermined by a suitable mechanism such as through observation of malicious network traffic where the network traffic is encrypted. For example, malicious network traffic such as network traffic occurring between two malicious software applications communicating via the computer network 202 is monitored to observe a portion of the network traffic and an estimated measure of entropy of the observed portion is evaluated and stored as the reference measure of entropy 209. The reference measure of entropy 209 is preferably evaluated using the same technique as is employed by the estimator 204 described above.

Accordingly, in use, the comparator 206 is operable to compare an estimated measure of entropy from the estimator 204 with the reference measure of entropy 209 for malicious encrypted traffic. In response to a determination, by the comparator 206, that the estimated measure of entropy for traffic communicated via the computer network 202 is sufficiently similar to the reference measure of entropy 209, the comparator 206 outputs a positive identification of malicious traffic on the computer network 202. The sufficiency of the similarity in the entropy measures can be achieved on the basis of a comparison algorithm including a comparison allowing for a degree of deviation based on a predetermined level of acceptable deviation. For example, the reference measure of entropy 209 can define a midpoint in a linear range of entropy measures deviating by a predetermined extent above and below the midpoint. Alternatively, the reference measure of entropy 209 can be a range of reference entropy measures.

On positive determination of malicious traffic by the comparator 206, a malicious traffic event 210 is generated to indicate that malicious traffic is identified on the computer network 202. The malicious traffic event 210 can further include, refer to, or correlate with information identifying any or all of: the network 202; a network connection occurring on the network 202; a protocol of a network connection occurring on the network 202; one or more of the endpoints, such as an address of systems, resources, appliances or entities, engaged in a network connection occurring on the network 202; other characterizing information for a network connection such as ports or session identifiers, and the like. The malicious traffic event 210 can be a consumable event for receipt by one or more components operable to receive the event and act upon the event. For example, the malicious traffic event 210 can trigger a communication to one or both endpoints of a malicious network connection for the purposes of informing the endpoint(s) that malicious communication is in progress. Alternatively, the malicious traffic event 210 can trigger a proactive termination of an identified malicious network connection, or an increase in a standard or level of network or system security employed by an endpoint of the malicious network connection. The malicious traffic event 210 can trigger a virus, malware, or other malicious software or configuration scan of a computer system, or a shutdown, closure or disconnection of a computer system, or any other suitable protective or remedial measures as will be apparent to those skilled in the art and which may depend on the nature, configuration and purpose of a computer system. Thus, in use, the malicious traffic event 210 suitable for triggering a protective component to protect an endpoint of the network connection from the malicious encrypted network traffic. The protective component (not illustrated) can be a software, hardware or firmware component operable to undertake one or more of, inter alia: terminating the network connection; initiate a scan for malware installed at an endpoint computer system; and adapt a level of security of an endpoint computer system or network connection.

Figure 3:
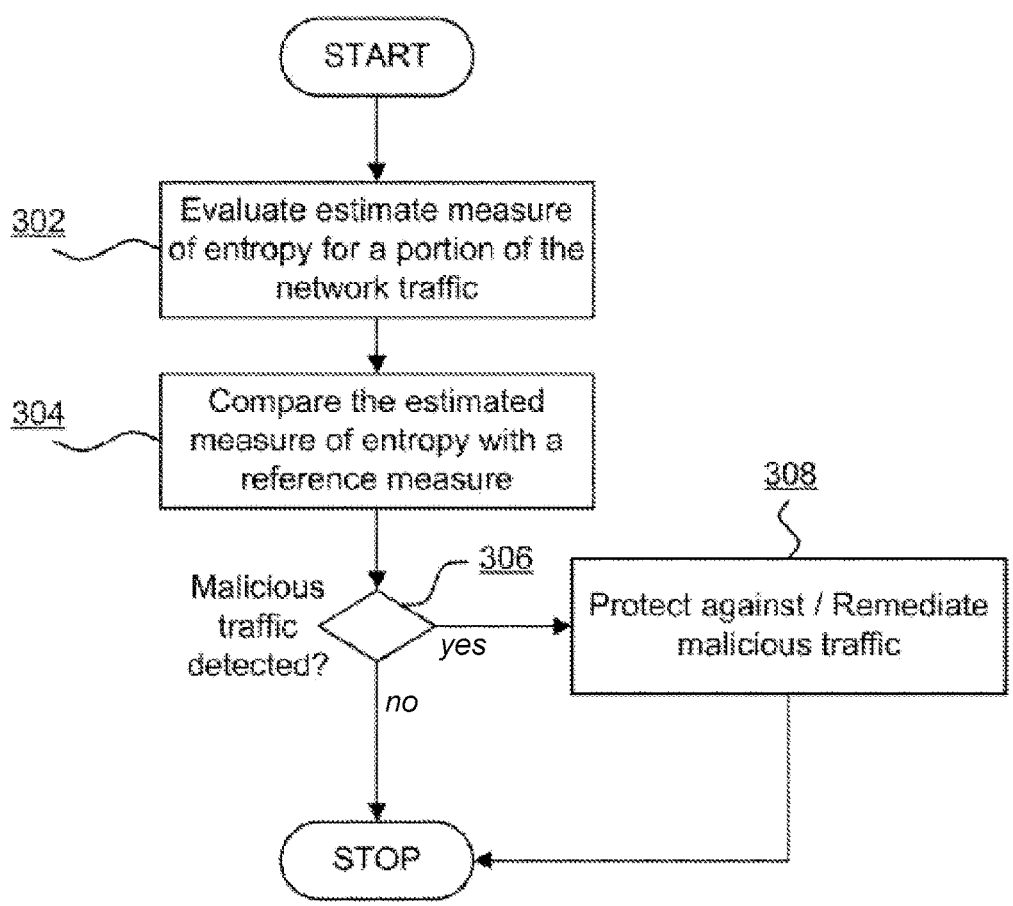
FIG. 3 is a flowchart of a method of the malicious encrypted traffic detector of FIG. 2 in accordance with an embodiment of the present disclosure.

FIG. 3 is a flowchart of a method of the malicious encrypted traffic detector 200 of FIG. 2 in accordance with an embodiment of the present disclosure. Initially, at 302, the entropy estimator 204 evaluates an estimated measure of entropy for a portion of network traffic. The portion of network traffic is selected to correspond to a connection setup portion of traffic for an application protocol employed by a network connection on the network 202. Such evaluation can be undertaken using the approach of Lall et al. outlined above. At 304 the entropy comparator 206 compares the evaluated estimated measure of entropy with a reference measure of entropy 209. At 306 detector 200 determines if malicious traffic is detected based on the comparison undertaken at 304. Where malicious traffic is detected, protective and/or remedial measures are taken at 308 in order to protect against the malicious network traffic and/or remediate malicious software operating at one or both of the communication endpoints.

Thus, in accordance with embodiments of the present disclosure, an estimate measure of entropy for a portion of network traffic occurring over a network connection is suitable for characterizing the network traffic for the purpose of comparing with reference measures of entropy for known malicious encrypted network traffic in order to identify malicious traffic. The portion of network traffic is selected as a continuous subset of the network traffic substantially corresponding to an application protocol connection setup. That is, the portion of network traffic substantially corresponds to a subset of the network traffic involved in the establishment of a connection for an application network protocol between two application endpoints. In an embodiment, the portion of network traffic corresponds directly to application protocol connection setup traffic. Application protocols include protocols occurring at the application layer of the Internet Protocol Suite as defined by RFC1122 (RFC 1122, Robert Braden, Internet Engineering Task Force, 1989, available at tools.ietf.org/html/rfc1122). Equivalently, application protocols include protocols occurring at the application, presentation or session layer of the Open Systems Interconnection (OSI) model of network protocols.

In alternative embodiments the malicious encrypted traffic detector 200 includes a Fourier transform coefficient evaluator in place of, or in addition to, the entropy estimator 204, and a coefficient comparator in place of, or in addition to, the entropy comparator 206. A Fourier transform is a mathematical transformation applied to a signal in a time or spatial domain in order to transform it to equivalent signals in the frequency domain. The transformation reveals frequencies and the extent of frequencies included in an original time domain signal. In the case of discrete signals, such as a series of bytes transmitted over a network connection, a Fourier transform takes the form of a so called Discrete Time Fourier Transform (DTFT) where input is a data sequence x[n] and output is an array or set of Fourier coefficients, as described below. Efficient algorithms for computing the Fourier transforms and DTFT are known in the art such as fast Fourier transform (FFT) algorithms including: a Cooley-Tukey algorithm such as the radix-2 decimation-in-time algorithm; the Prime-factor FFT algorithm or the Good-Thomas algorithm (Good, I. J. (1958). "The interaction algorithm and practical Fourier analysis", Journal of the Royal Statistical Society, Series B 20 (2): 361-372. JSTOR 2983896, Addendum, ibid. 22 (2), 373-375 (1960) JSTOR 2984108) (Thomas, L. H. (1963). "Using a computer to solve problems in physics". Applications of Digital Computers. Boston: Ginn.); Bruun's FFT algorithm (Georg Bruun, "z-Transform DFT filters and FFTs," IEEE Trans. on Acoustics, Speech and Signal Processing (ASSP) 26 (1), 56-63 (1978)); Rader's FFT algorithm (C. M. Rader, "Discrete Fourier transforms when the number of data samples is prime," Proc. IEEE 56, 1107-1108 (1968)); Bluestein's FFT algorithm (Leo I. Bluestein, "A linear filtering approach to the computation of the discrete Fourier transform," Northeast Electronics Research and Engineering Meeting Record 10, 218-219 (1968)); and the family of the RADIX algorithms.

In such alternative embodiments the Fourier transform coefficient evaluator is arranged to evaluate an array of Fourier transform coefficients for elements of a portion of network traffic occurring over the network connection. For example, such elements are bytes communicated via the network connection in a portion of network traffic substantially corresponding to a subset of the network traffic involved in the establishment of a connection for an application network protocol between two application endpoints, known as a connection setup portion. Thus a Fourier coefficient evaluated for each byte in such portion results in a set of coefficients such as an array of coefficients. Notably other elements of data transfer could be used such as groups of bytes of fixed size or chunks of network traffic. In accordance with such alternative embodiments the store additionally or alternatively includes a reference set of coefficients corresponding to coefficients for a malware communication such as may be observed or learned from measuring, observing, monitoring or otherwise resulting from known malware network traffic communicated via the network 202 or an alternative and comparative network. Thus, in such alternative embodiments the method of FIG. 3 is adapted such that Fourier transform coefficients are evaluated at 302 and compared at 304.

The exact nature and extent of an application protocol connection setup will vary for different application protocols and the identification of a part of an application network communication constituting a connection setup will be apparent to those skilled in the art. The connection setup will substantially correspond to a portion of a communication that is consistently required for the setup of communications using the application protocol. Notably, connection setup excludes substantive traffic being traffic for which a network connection is created (i.e. the payload, freight or cargo of a network communication taken as a whole). Where substantive traffic is encrypted, the highly variable nature of the encrypted substantive traffic resulting from the encryption causes a corresponding measure of entropy or evaluation of Fourier transform coefficients that tends towards the entropy or coefficients of a random source. A measure of entropy of evaluation of coefficients for random traffic cannot characterize the network traffic for the purpose of comparing with a reference measure or coefficients for known malicious encrypted network traffic. Thus a connection setup portion of traffic is used for the evaluation of an estimated measure of entropy and/or Fourier transform coefficients, the connection setup portion consisting of potentially unencrypted and/or encrypted data.

For example, an application protocol for the transmission of multimedia data, such as the H.323 protocol (Packet-Based Multimedia Communications System, the International Telecommunications Union (ITU), 2009 and Amendment 1 dated March 2013, available from www.itu.int/rec/T-REC-H.323) includes a connection setup portion and a substantive portion. The substantive portion of an H.323 communication is that portion including multimedia data communicated via an RTP communication channel (Real-time Transport Protocol)—and being the substantive traffic for which a connection is created. The connection setup portion of an H.323 communication is that portion of network traffic required to establish the network connection in order that the multimedia data can be communicated in a desired manner. Thus, with reference to the use of the H.323 communication for a Voice Over IP (VOIP) communication, the connection setup portion of a communication will include: a H.225/Q931 call setup (ITU, 2009 and Amendment 1 dated March 2013, available from www.itu.int/rec/T-REC-H.225.0); a H.245 negotiation (ITU, 2011, available from www.itu.int/rec/T-REC-H.245); and a H.245 voice path setup for an RTP communication channel. Subsequently, substantive voice data is transmitted over the established RTP channel. Such substantive data can be encrypted involving further connection setup tasks, such as in accordance with the H.235 security standard (H.235.0 to H.235.7, ITU, 2005 and 2014, available from www.itu.int).

Figure 4:
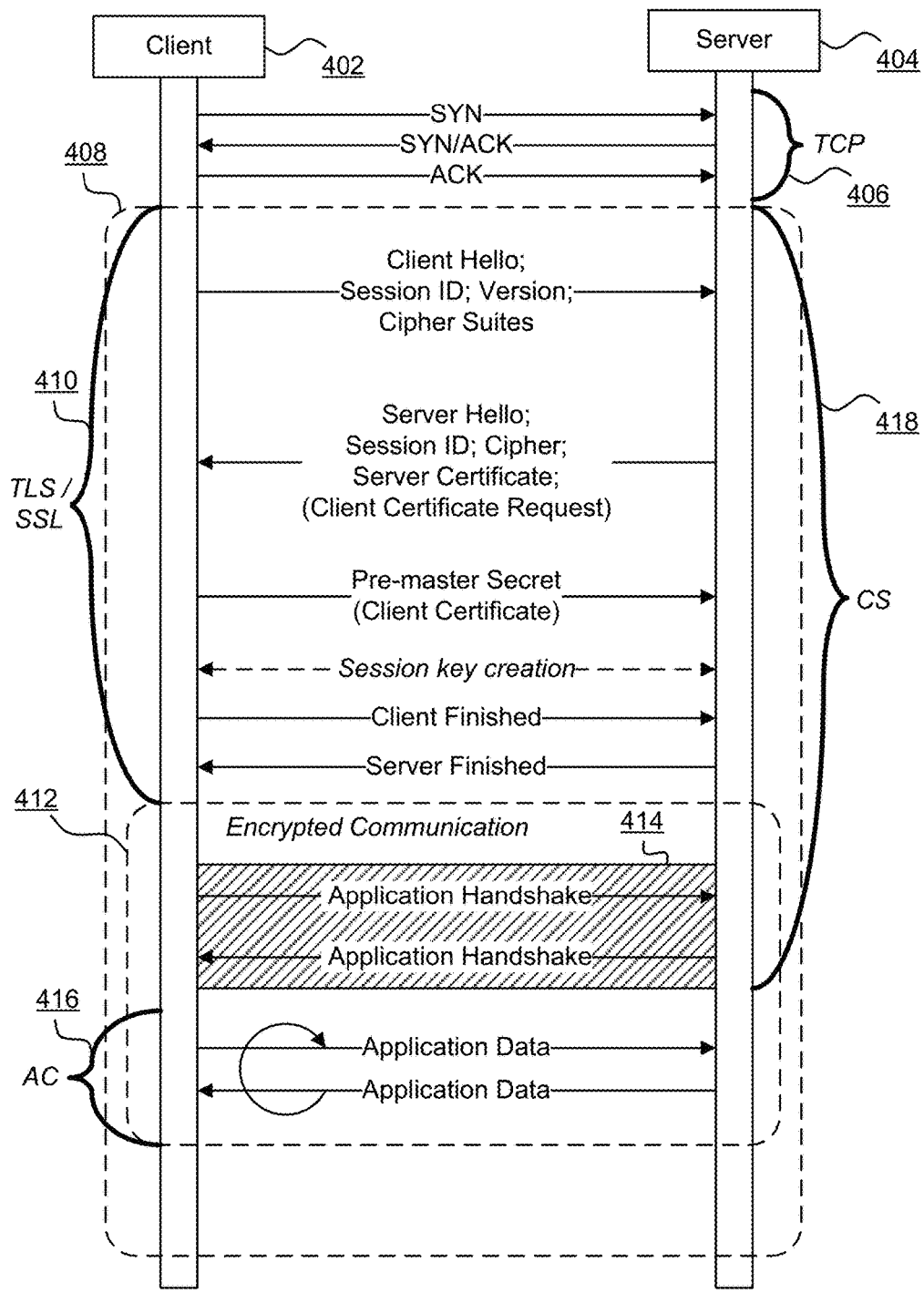
FIG. 4 is an exemplary illustration of the connection setup and communication of encrypted data between a client and a server in accordance with an embodiment of the present disclosure.

By way of further example, FIG. 4 is an exemplary illustration of the connection setup and communication of encrypted data between a client 402 and a server 404. The tasks indicated at 406 generally relate to the internet's TCP setup including a 'SYN', 'SYN/ACK' and 'ACK' messages. These messages relate to the TCP protocol at the transport layer and serve to establish a TCP connection with segment sequence number synchronization. Following these tasks a TCP connection is created between the client 402 and server 404 indicated by the broken line 408. Subsequently, the tasks indicated at 410 generally relate to the creation of an encrypted connection using the Secure Sockets Layer (SSL) or Transport Layer Security (TLS) protocol. As will be familiar to those skilled in the art, the SSL and TLS protocols are cryptographic protocols at the application layer of the Internet Protocol Suite that use asymmetric cryptography to securely establish a symmetric session key for encrypting data communicated between endpoints. Thus, subsequent to the establishment of the secure connection at 410, a secure SSL or TLS session is provided between the client 402 and server 404, as indicated by the broken line 412. Subsequently, an application protocol for exchanging data between software applications executing at each of the client 402 and server 404 is established. Such an application protocol can be a standardized or application specific protocol and can include an initial set of messages for establishing an application protocol connection, referred to in FIG. 4 as an application handshake. Examples of applications protocols include internet protocols such as, inter alia: FTP (file transfer protocol); Telnet; SSH (secure shell); SMTP (simple mail transfer protocol); IMAP (internet message access protocol); POP (post office protocol); SNMP (simple network management protocol); HTTP (hypertext transfer protocol); and CMIP (common management information protocol). Further, applications protocols can include service or application specific protocols such as, inter alia: AFP (Apple filing protocol, formerly AppleTalk); JNDI (Java naming and directory interface); SOAP (simple object access protocol); RDP (remote desktop protocol); NFS (network file system); X Window System; Java remote method protocol; and very many others. Yet further, bespoke application protocols can operate at the application layer such as, inter alia: database access protocols such as Oracle Net; messaging protocols such as Apple iMessage or Google Wave Federation Protocol; voice or media protocols such as the proprietary Skype protocol; cryptocurrency protocols such as BitCoin protocol; and very many others.

A handshake phase of an application protocol can include negotiation, configuration, authentication, further or alternative cryptographic setup, authorization and/or access control, information exchange, parameter configuration, sequencing and the like. Referring again to FIG. 4, following the establishment of a secure SSL/TLS connection an application protocol handshake takes place as indicated by the hatched area 414. In the example of FIG. 4 the application handshake will be encrypted using the session key established for the SSL/TLS session 408. It will be appreciated by those skilled in the art that application protocols could alternatively manage their own cryptographic communications mechanism instead of, or in addition to, an SSL/TLS session 408. The nature and extent of the application handshake 414 will vary depending on the type of application protocol employed and can be protocol specific. Where the protocol specification is public, the nature and extent of the application handshake 414 will be well known.

Subsequent to the application protocol setup 414, an application communications session is established and application data is exchanged between the client 402 and server 404 as indicated generally at 416 "AC" (application communication) in FIG. 4. Thus the application data exchanged at 416 will be encrypted. Where the communicating application has a vulnerability, such as a susceptibility to buffer overflow attack, a programming error, format string vulnerabilities, security lapses or misconfigurations and the like, then the vulnerability is susceptible to exploitation. Exploitation can involve the ultimate execution of arbitrary code by an unauthorized entity such as by way of system access via shellcode or the like. Such exploitation can ultimately lead to the installation of malware on the exploited computer system and, as previously described, when such exploitation takes place over an encrypted network connection such as that illustrated in FIG. 4, the difficulty in identifying such an exploitation increases considerably.

Accordingly, embodiments of the present disclosure evaluate an estimate measure of entropy or a set of Fourier transform coefficients for a portion of network traffic occurring over a network connection. The portion is selected such that the portion is suitable for characterizing the network traffic for the purpose of comparing with reference measures of entropy or coefficients for known malicious encrypted network traffic in order to detect malicious encrypted traffic. Monitoring a trend in network traffic, such as is proposed by Olivain et al., is not effective where the network traffic is encrypted since, as previously noted, entropy of and coefficients for encrypted network traffic will tend towards those of a random sample. In contrast, embodiments of the present disclosure evaluate an estimate measure of entropy of or coefficients for a specifically chosen portion of a network communication consisting of the application protocol connection setup. FIG. 4 illustrates such a portion as "CS" 418 (connection setup). It can be seen, in FIG. 4, that portion 418 constitutes a window of network traffic occurring in all the network traffic for the network connection. The connection setup portion of FIG. 4 is defined to include the TLS/SSL negotiation traffic and the application handshake 414. Notably, the application handshake of FIG. 4 is encrypted, and this will influence the estimate of entropy and coefficients, though the substantive traffic constituted by the application data 416 is excluded since this would lead to an entropy estimate or coefficients increasingly tending to that of a random sample. Note further that the TCP connection setup 406 is excluded since this is not an application layer protocol of the Internet Protocol Suite. The TCP connection setup 406 will be largely consistent for all connections save for connection characterizing information such as addresses and ports, and so the value of the TCP connection setup 406 for an estimated entropy evaluation is low. In some embodiments the TCP connection setup 406 is included in an entropy estimation since the effect of including the TCP connection setup 406 may, in some embodiments, be considered consistent across all network connections and accordingly becomes self-cancelling for comparison purposes. In some embodiments, however, the TCP and other, similar or alternative lower layer protocols such as transport, internet and link layer protocols, are excluded from the portion of network traffic for the evaluation of an estimated measure of entropy or evaluation of coefficients. Preferably, the identification of a lower layer protocol connection setup, such as the TCP connection setup 406, is used to determine the commencement of an application setup portion of network traffic.

The definition of a portion of network traffic over a network connection for use in evaluating an estimate of entropy or coefficients is predetermined and protocol specific. A definition of an application protocol can be used to determine the number and/or size of network segments, packets, messages or the like that suitably constitute the required portion for the protocol. The portion is a continuous and unbroken portion of network traffic relating to the connection setup characteristics in order that malicious traffic can be identified efficiently and ahead-of-time in order that appropriate remediation and/or protection measures can be employed without necessarily acquiescing to malicious communication. Notably, the portion is not disconnected or comprised of selected fields or multiple portions of network traffic—such an approach introduces inefficiencies in both the identification of relevant parts of network traffic and also in the evaluation of an estimated entropy measure or the evaluation of Fourier transform coefficients. Further, such an approach cannot ensure the efficient and effective application of the entropy evaluation mechanism for streamed network traffic as described by Lall et al.

It is necessary to ensure that the portion of network traffic used by the entropy estimator 204 for the evaluation of an estimated measure of entropy is consistent with a portion of network traffic used to evaluate the reference measure of entropy 209 and similarly that the portion used by a Fourier transform coefficient evaluator is consistent with a portion of network traffic used to evaluate reference coefficients. That is to say that, for example, a portion definition for a protocol of network traffic in a network connection over the network 202 applies equally to the entropy estimator 204 and the mechanism used to determine the reference measure of entropy 209, which can also be a process of entropy estimation consistent with that of the estimator 204. If the portions are not consistent then the opportunity to identify malicious traffic corresponding to the reference measure of entropy 209 are reduced and can be eliminated.

In one embodiment, where a network connection is provided via a TCP connection, the portion of network traffic for evaluation of an estimate measure of entropy or for evaluation of Fourier transform coefficients is determined to be a continuous subset of traffic occurring over the network connection subsequent to a TCP handshake portion and up to a point in a flow of network traffic on the network connection where the traffic is substantially all encrypted. Such a portion can correspond substantially to an application protocol connection setup portion for some protocols.

Figure 5:
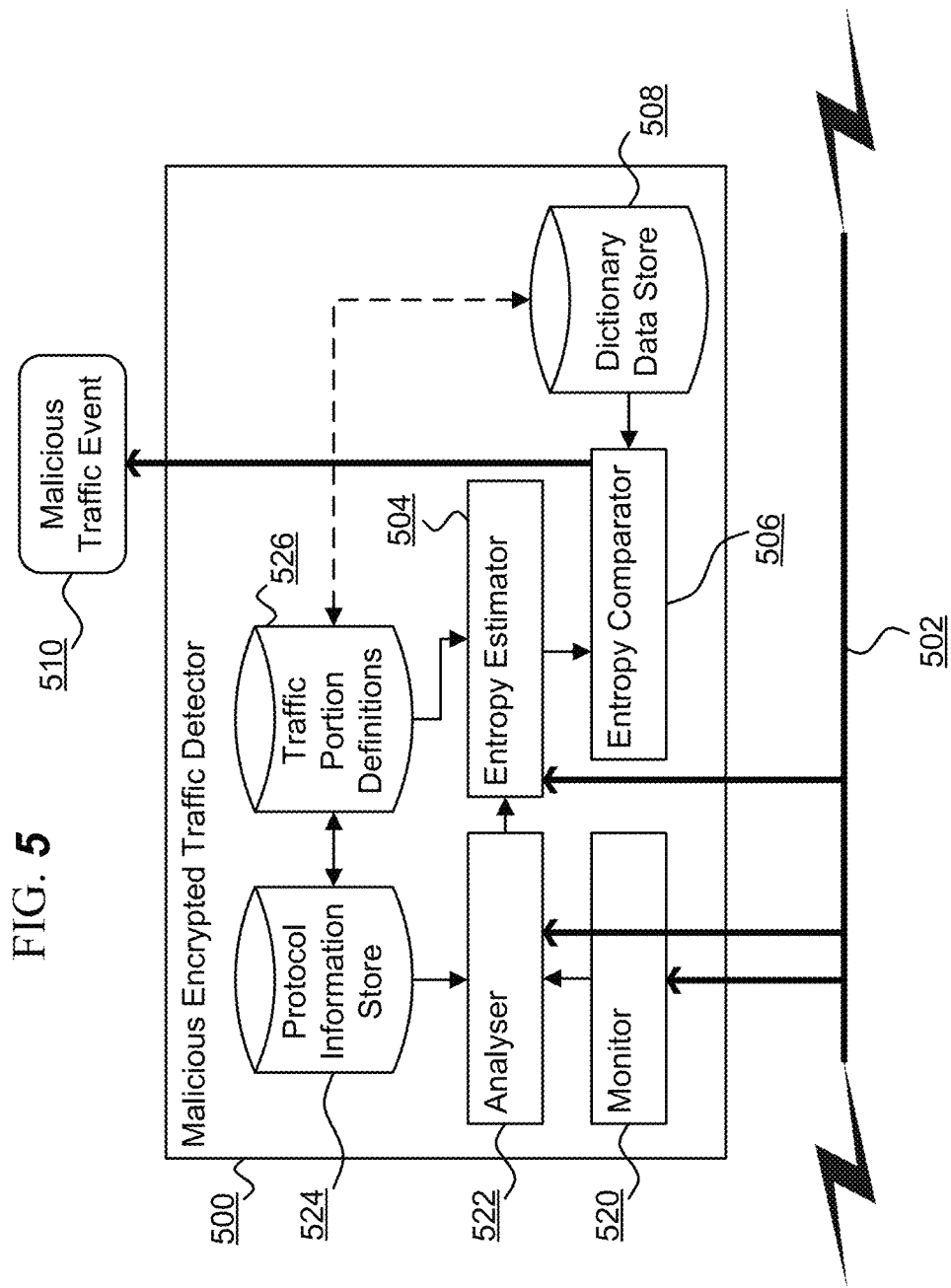
FIG. 5 is a component diagram of a malicious encrypted traffic detector in accordance with an embodiment of the present disclosure.

FIG. 5 is a component diagram of a malicious encrypted traffic detector 500 in accordance with an embodiment of the present disclosure. Many of the features of FIG. 5 are consistent with those of FIG. 2 and these will not be repeated. Further it will be appreciated that: references to evaluating an estimate measure of entropy equally apply to evaluating Fourier transform coefficients; references to reference measures of entropy equally apply to reference Fourier transform coefficients; and references to comparisons between estimated measures of entropy and reference measures of entropy equally apply to comparisons between evaluated Fourier transform coefficients and reference Fourier transform coefficients. The detector 500 of FIG. 5 further includes a monitor 520 and analyzer 522 as software, hardware or firmware components. The monitor 520 is operable to monitor network traffic occurring over the network 502 to identify network connections. In an embodiment, the monitor 520 is operable to identify the commencement of new network connections by identifying known connection setup characteristics of protocols used for communication via the network 502. For example, the monitor 520 can be operable as a network component adapted to a promiscuous mode of operation in which all network traffic passing via the network 502 is accessible to the monitor 520 as a type of network sniffer. In one embodiment, the monitor 520 is adapted to operate in a raw socket mode of operation. For example, the monitor 520 can be implemented using the libpcap library or similar. In use, the monitor 520 identifies new network connections. For example, the monitor 520 can identify the commencement of a TCP connection by identifying the TCP connection setup including 'SYN', 'SYN/ACK', 'ACK' segments. In this way, new network connections created over the network 502 are detected by the monitor 520.

The analyzer 522 is operable to analyze a new network connection identified by the monitor 520 to identify characteristics of the network connection to determine an application protocol of the network connection. The determination of an application protocol is made with reference to a protocol information store 524 storing one or more characteristics of application protocols as one or more criteria. The criteria, when satisfied, are suitable for identifying a protocol of a network connection. In one embodiment, an application protocol for a network connection is determined based on an identification of port numbers for the network connection since port numbers are generally application specific. Internet Protocol Suite ports numbered from 0 to 1023 are designated well-known ports for most widely-used network services. Ports 1024 to 49151 are registered ports assigned by the Internet Assigned Numbers Authority (IANA) for specific services. Some application protocols adopt ports unofficially and through convention and widespread usage become synonymous with their adopted port numbers. A list of ports and associated application protocols is available from IANA as "Service Name and Transport Protocol Port Number Registry" (2014, available from www.iana.org/assignments/service-names-port-numbers/service-names-port-numbers.txt).

In alternative embodiments, further characteristics of the network connection observable by the analyzer 522 can be used to determine the application protocol. For example, unencrypted connection setup information or protocol-specific information, data or headers disclosed as part of the network connection.

Each protocol in the protocol information store 524 has associated one or more portions in the traffic portion definitions store 526. The traffic portion definitions 526 include a definition of a portion of network traffic for the evaluation of an estimate of entropy by the entropy estimator 504. As described above, each traffic portion definition 526 identifies a continuous subset of network traffic as a window of network traffic corresponding to an application protocol connection setup portion of network traffic. The traffic portion definitions 526 are predefined and can be based on definitions of application protocols or observation of application protocols in use. In an embodiment, a portion definition 526 includes a definition of an amount of traffic following a TCP connection setup, such as a number of segments, packets, messages or bytes, commencing at a reference starting point in network traffic. Thus, in one embodiment, each portion is a subset of network traffic subsequent to a transport protocol handshake and up to a predetermined endpoint. In an alternative embodiment, a portion definition 526 includes a definition of a starting point, such as a starting byte or segment, in a sequence of network traffic, and a definition of an ending point such as an ending byte or segment or a number of bytes or segments. Most preferably, each traffic portion definition in the store 926 is protocol specific such that a definition of a portion of traffic is specific to a particular protocol in the protocol information store 924. In all cases the portion is defined to be a continuous, unbroken subset of network traffic defined as some window of network traffic communicated for a network connection. While the protocol information store 524 and traffic portion definitions 526 are illustrated as different and separate data stores, it will be apparent to those skilled in the art that the protocol information and traffic portion definitions can alternatively be stored in a common data store.

The entropy estimator 504 is adapted to retrieve one or more definitions of a portion of network traffic from the traffic portion definitions 526 based on the protocol for the network traffic determined by the analyzer 522. The entropy estimator 504 is further adapted to estimate a measure of entropy for the network connection as an estimated measure of entropy of each portion of traffic for the connection according to the retrieved traffic portion definitions 526. The measure of entropy is estimated as described above. Where multiple traffic portion definitions 526 are retrieved for a protocol, such portion definitions will constitute windows of network traffic that may overlap or occur adjacent in the flow of network traffic. Thus, the evaluation of an estimate of a measure of entropy for each of the retrieved traffic portion definition 526 may involve multiple evaluations covering the same network traffic to differing extents: such that evaluations occur for all windows of the traffic constituting each of the retrieved traffic portion definitions 526. In an embodiment this is efficiently achieved by receiving, intercepting, sniffing, recording or otherwise accessing network traffic in a window of network traffic for a connection covering the windows of all retrieved traffic portion definitions 926. Subsequently, individual traffic portion definitions 926 can be applied to the network traffic so accessed in order to undertake entropy evaluations for each portion individually. In such embodiments it is necessary to access the network traffic only once from the network, attending to the evaluation of multiple measures of estimated entropy subsequently.

The entropy comparator 506 is adapted to receive an estimate measure of entropy for the network connection from the estimator 504 and compare the estimate measure of entropy with entropy measures recorded in a dictionary data store 508. The dictionary data store 508 stores a dictionary of one or more entropy measures, each being associated with a type of malicious communication such as malware or an exploit. The entropy measures in the dictionary 508 are predetermined and preferably based on evaluated estimate measures of entropy for known malicious encrypted network traffic. Notably, the entropy measures in the dictionary 508 are evaluated based on a portion of network traffic for a particular application protocol that is consistent with the portion used by the entropy estimator 504 for a new network connection. Thus, the entropy measures in the dictionary 508 are most preferably evaluated based on the traffic portion definitions 526 for known malicious encrypted traffic. As described above with respect to the reference measure of entropy of FIG. 2, the entropy measures in the dictionary 508 can be determinate measures, ranges of measures, or measures from which some degree of deviation is permitted to identify similarity of measures. Known malicious encrypted network traffic includes network traffic known to contain malicious encrypted payload, such as network traffic delivering encrypted malware. Further, known malicious encrypted network traffic includes encrypted network traffic known to relate to communications from a malicious endpoint of a network connection, such as network traffic arising from or occurring between installed malware components. Further, known malicious encrypted network traffic includes encrypted network traffic relating to communications between a malicious entity, such as a malicious software application, and a genuine (non-malicious) software application, where the genuine software application is susceptible to a vulnerability and the malicious software application is communicating with the genuine software application to exploit such vulnerability. Other types, forms and categories of malicious encrypted network traffic will be known to those skilled in the art and any or all of these types of malicious encrypted network traffic are suitable as a basis for defining entropy measures associated with a portion of network traffic of a malicious encrypted network connection.

Notably, encrypted malicious network traffic will include unencrypted portions, such as at least part of a connection setup portion of the encrypted malicious network traffic. It will, therefore, be clear to those skilled in the art that an entropy measure associated with a portion of network traffic of a malicious encrypted network connection will include at least part of the portion being unencrypted. This is because the malicious network connection is primarily encrypted in terms of the substantive payload of the network connection (e.g. the encrypted malware, or malware communication, communicated via the network connection).

For example, the dictionary data store 508 can include records for different malware or exploits, X and Y, providing ranges of entropy measure indicative of such malware, of such as:

| Malware or Exploit | Portion   | Measure of Entropy |
|--------------------|-----------|--------------------|
| X                  | Portion n | a to b             |
| Y                  | Portion m | c to d             |
| ...                |           | ...                |

Notably, the 'portion' is protocol specific and accordingly implies a particular protocol. Where malware communicates over, or exploits, potentially multiple application protocols, then multiple malware entries can occur in the dictionary 508 including entries for different portions, constituting different protocols. Alternative formulations of the dictionary 508 will be apparent to those skilled in the art.

Figure 6A:
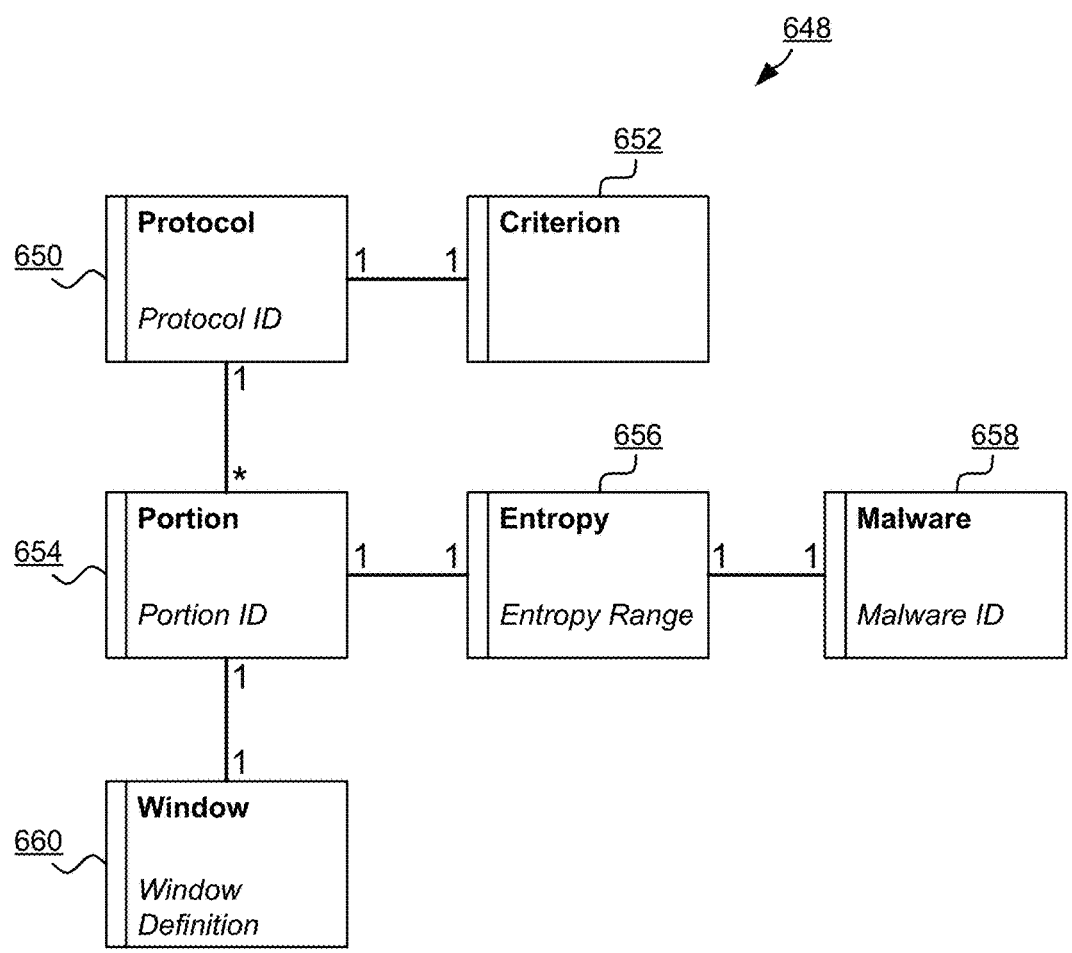
FIG. 6a illustrates an exemplary data schema in accordance with an embodiment of the present disclosure.

FIG. 6a illustrates an exemplary data schema 648 in accordance with an embodiment of the present disclosure. The data schema 648 includes data structure definitions and relationships suitable for storing data for the operation of the embodiment of FIG. 5. A protocol data structure 650 includes a unique protocol identifier and has a one-to-one association with a protocol criterion 652. For example, the criterion 652 can include a port number. In an alternative embodiment, the protocol 650 can be associated with one or more criteria that uniquely define a particular application network protocol. The protocol 650 is further associated with any number of portion definitions 654, each portion having a unique identifier. Each portion is defined by association with a window 660 having a window definition. For example, a window can be defined by a byte offset of a starting point and an ending point in a network connection data stream. Other suitable mechanisms for defining windows in a network connection data stream will be apparent to those skilled in the art. The portion 654 further has a one-to-one association with an entropy data structure 656. In the exemplary embodiment of FIG. 6a, the entropy data structure 656 includes an entropy range, such as a low entropy measure to a high entropy measure. Other suitable mechanisms for recording one or more or a range of entropy measures for a portion 654 can alternatively be employed. For example, a midpoint entropy measure can be recorded in the entropy data structure 656, and a definition of a configurable or predetermined similarity criterion (such as a maximum distance from the midpoint entropy) can be employed to determine similar measures of entropy with reference to the entropy data structure 656. The entropy data structure 656 has a one-to-one association with a malware record 658. The malware record relates to a particular piece of malware or a particular exploit having a unique identifier. In alternative embodiments the entropy data structure 656 is replaced by or supplemented with a set of Fourier transform coefficients or coefficient indicators such as: an array of coefficients; an array of coefficient ranges; an array of coefficient high, low, average, median, mean or mode values; an array of coefficients each coefficient being associated with one or more deviation values or proportions; and the like.

In one embodiment, the data schema 648 is implemented using relational data storage means, such as a relational database. In such an embodiment, the protocol information store 524 can have a table definition as:

| Protocol ID (primary key) | Criterion (foreign key) |
|---|---|
| ... | ... |

Further, the traffic portion definitions store 526 can have a table definition as:

| Portion ID (primary key) | Protocol ID (foreign key) | Window |
|---|---|---|
| ... | ... | ... |

A schema such as is illustrated in FIG. 6a provides a per-protocol, per-malware definition of a portion of network traffic. It will be appreciated that such an arrangement can provide for potentially multiple portions defined for each protocol as most suitable portions for identifying the presence of malicious encrypted communication attributable to multiple malwares and/or exploits.

Figure 6B:
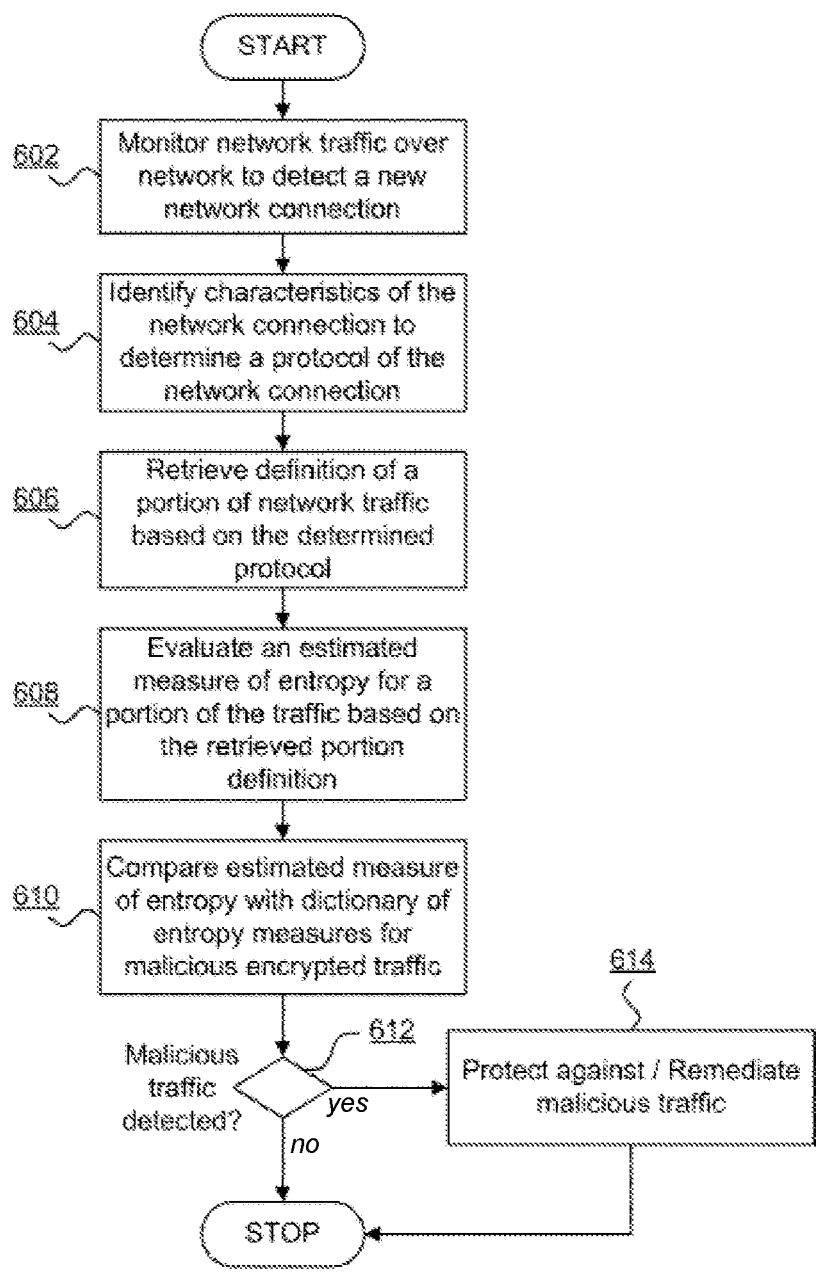
FIG. 6b is a flowchart of a method of the malicious encrypted traffic detector of FIG. in accordance with an embodiment of the present disclosure.

FIG. 6b is a flowchart of a method of the malicious encrypted traffic detector 500 of FIG. 5 in accordance with an embodiment of the present disclosure. Initially, at 602, the monitor 520 monitors network traffic over the network 502 to detect a new network connection. Such detection can be made by identifying network connection setup messages such as TCP 'SYN', 'SYN/ACK', 'ACK' segments. At 604 the analyzer 522 identifies characteristics of the network connection to determine a protocol of the network connection. At 606 a definition of a portion of the network traffic is retrieved based on the protocol identified at 604. It will be appreciated that multiple portion definitions may alternatively be retrieved, in which case subsequent tasks are repeated for each portion. At 608 an estimated measure of entropy is evaluated for a portion of network traffic in the network connection based on the portion definition (or definitions) retrieved at 606. At 610 an the estimated measure of entropy is compared with the measures of entropy in the dictionary data store 508 to determine if malicious encrypted traffic is detected at 612. Where malicious encrypted traffic is detected at 612, the method proceeds to 614 to instigate protective and/or remedial measures to protect one or more computer systems from negative effects of the malicious network traffic and/or malicious software associated with the malicious network traffic. In an alternative embodiment 608 and 610 can additionally or alternatively evaluate Fourier transform coefficients for elements (such as bytes) of a portion of network traffic (608) and compare the evaluated coefficients with a dictionary of sets of coefficients for malicious encrypted network traffic (610).

In this way embodiments of the present disclosure identify malicious encrypted network traffic even where a payload of a network connection is entirely encrypted and where the network traffic exhibits expected entropy or Fourier transform characteristics for an encrypted connection, such as, for example, a tendency of entropy of a connection towards the entropy of a random source as would be expected for genuine (non-malicious) encrypted traffic. Embodiments of the present disclosure utilize the distinctive nature of application protocol connection setup characteristics as a basis for estimating the entropy of or evaluating coefficients for a network connection as a distinguishing feature for the network connection. Connection setup negotiation, protocol selection, parameter selection, encryption options including cypher or algorithm selection and parameters, key exchanges and the like all constitute characterizing features of the connection setup portion of an application protocol. Notably, such features will be consistent between communications such that malicious software will largely employ similar or identical characteristics in application protocol setup. There can be constraints on malware that require consistent communication setup—such as a need for an approach to communication setup that is be compatible between a local and remote system and therefore cannot change dramatically. For example, malware at a server seeking to communicate with installed malware at a client will employ a network connection having connection setup characteristics known to be compatible with, or expected by, the installed malware at the client. Further, exploitation of certain system vulnerabilities can require certain communication configuration, including application protocol setup. Accordingly the constraints on malware to the variability of connection setup characteristics results in the connection setup process for an application protocol as a good distinguishing characteristic for malicious encrypted communication.

The types of encrypted communication that are suitable for detection by embodiments of the present disclosure include, inter alia, communication between systems infected with malware, such as malware-to-malware communication. Further, communication can include communication from a malware server to a client computer system for the purpose of exploitation and installation/transfer of malware (such as infection). These types of communication are considered below with respect to FIGS. 7, 8a and 8b.

Figure 7:
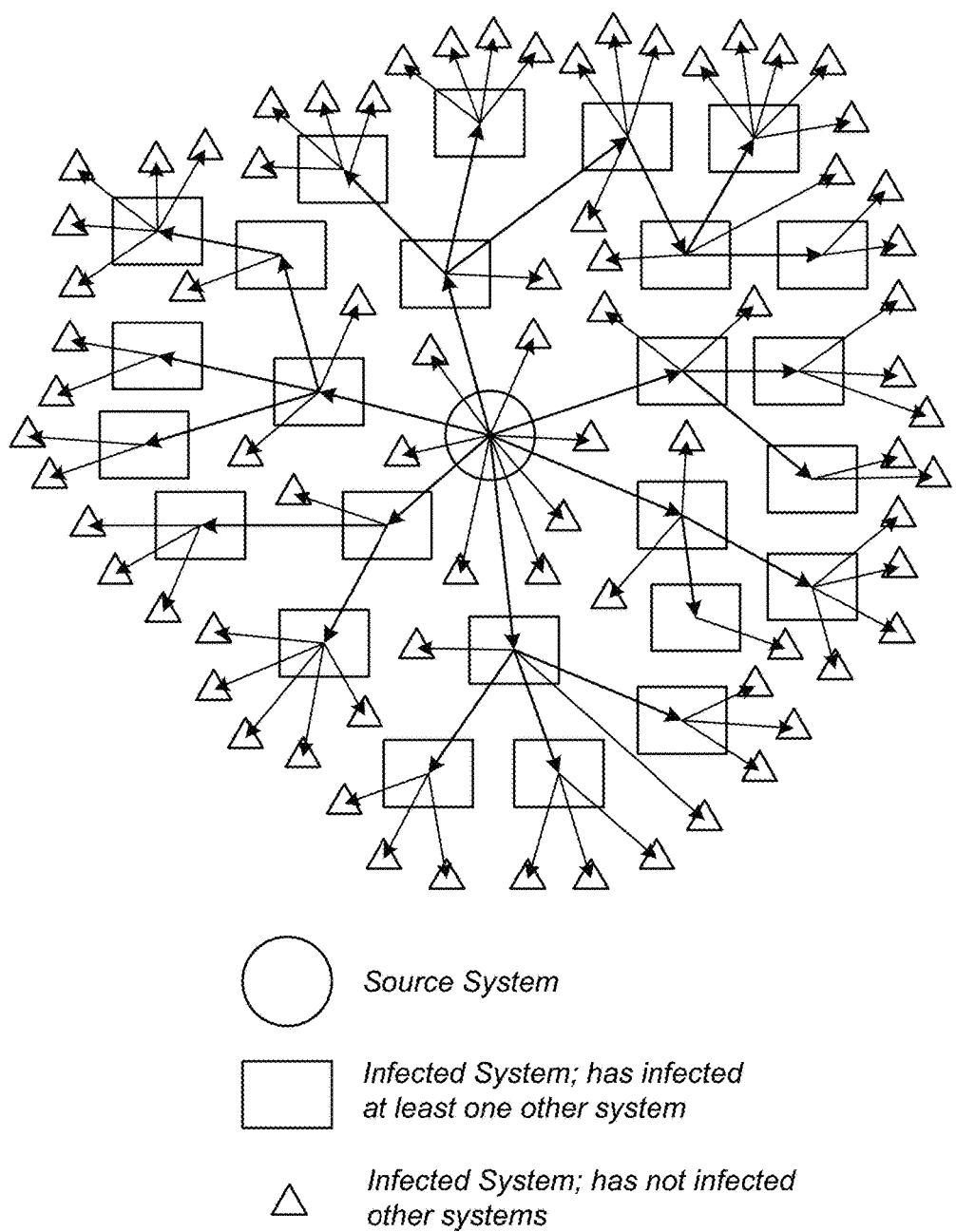
FIG. 7 is a depiction of a propagation tree of self-propagating malware.

The propagation of malware throughout computer systems via computer networks has been studied by Chen et al. in "Spatial-Temporal Modeling of Malware Propagation in Networks" (IEEE, 2005). Chen et al. identify multiple observed approaches to malware propagation including random scanning, in which a malware infection seeks to infect targets randomly, and topological scanning in which malware examines local network configuration files to detect network neighbor candidates for malware infection. FIG. 7 is a depiction of a propagation tree of self-propagating malware. A source of malware is illustrated as a network connected computer system depicted by a circle. Each network connected computer system infected by the malware that have also infected other systems is depicted by a rectangle. Each network connected computer system infected by the malware that have not infected other systems is depicted by a triangle. It can be seen, from FIG. 7, that self-propagating malware can rapidly lead to large numbers of infected systems spanning a wide network reach. Where the mode of propagation is by transfer of encrypted malware in a network communication, each propagation (each arrow in FIG. 7) can correspond to a network connection between an infecting and a target system, across which encrypted malware may be communicated. These network connections are monitored by embodiments of the present disclosure to detect malicious encrypted network traffic to prevent, protect against or remediate malware infections.

Figure 8:
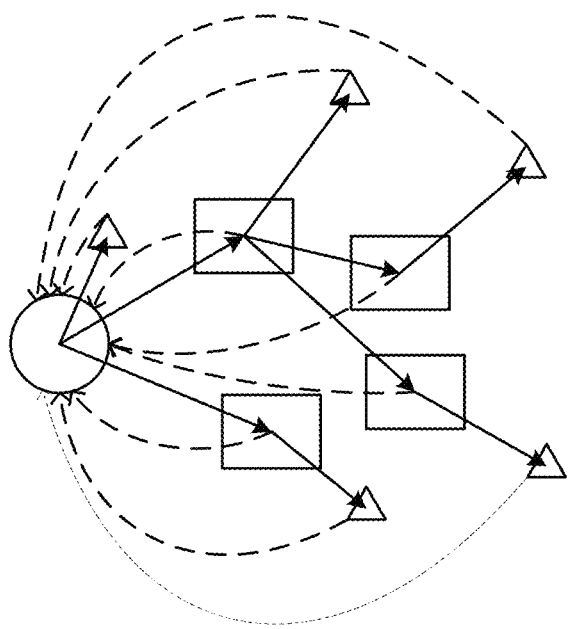
FIG. 8a is a portion of the propagation tree of self-propagating malware of FIG. 7 with additional network communications indicated.
FIG. 8b is a portion of the propagation tree of self-propagating malware of FIG. 7 with additional network communications indicated.

FIG. 8a is a portion of the propagation tree of self-propagating malware of FIG. 7 with additional network communications indicated. The broken lines in FIG. 8a indicate possible network connections between infected systems and a source of malware, such as a malware mothership (indicated by the circle). Each of these network connections can be used to share information about infected systems, to communicate data extracted, stolen or otherwise accessed from infected systems, to instruct or control infected systems etc. Accordingly, each of these communications can be undertaken in encrypted form by using encrypted application protocols and these communications can be monitored by embodiments of the present disclosure to detect malicious encrypted network traffic to prevent, protect against or remediate malware infections.

Figure 8B:
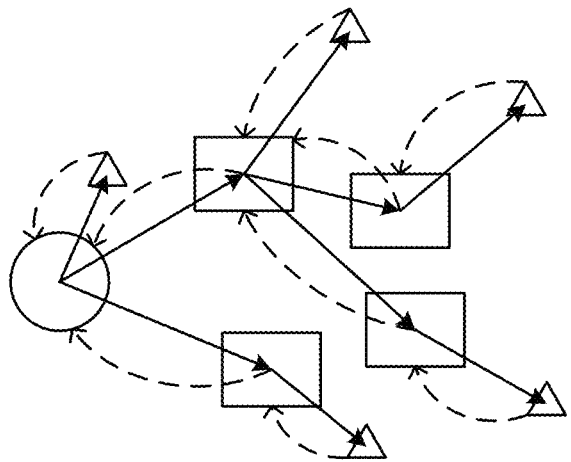

FIG. 8b is a portion of the propagation tree of self-propagating malware of FIG. 7 with additional network communications indicated. The broken lines in FIG. 8b indicate possible network connections between infected systems. Malware may operate with infected systems communicating with each other to distribute the range of addresses between which the malware communicates to a set of unpredictable and disparate addresses as a means to avoid detection. Thus, only a small set of malware infected systems may communicate directly with a malware source. Each network connection in FIG. 8b can be used to share information about infected systems, to communicate data extracted, stolen or otherwise accessed from infected systems, to instruct or control infected systems etc. Accordingly, each of these communications can be undertaken in encrypted form by using encrypted application protocols and these communications can be monitored by embodiments of the present disclosure to detect malicious encrypted network traffic to prevent, protect against or remediate malware infections.

In one embodiment, the portion of network traffic for which an estimated measure of entropy and/or Fourier transform coefficients are evaluated is selected from a plurality of possible windows of network traffic based on a degree of consistency of similarity of estimated measures of entropy or sets of coefficients for known malicious encrypted traffic. That is to say, in certain embodiments, a portion for evaluation is a continuous subset of known malicious traffic occurring within a particular window that exhibits consistently similar measures of entropy of values or ranges of Fourier transform coefficient such that the portion constitutes an effective basis for characterizing the malicious traffic. Accordingly, the portion constitutes an effective basis for detecting the malicious traffic.

Figure 9:
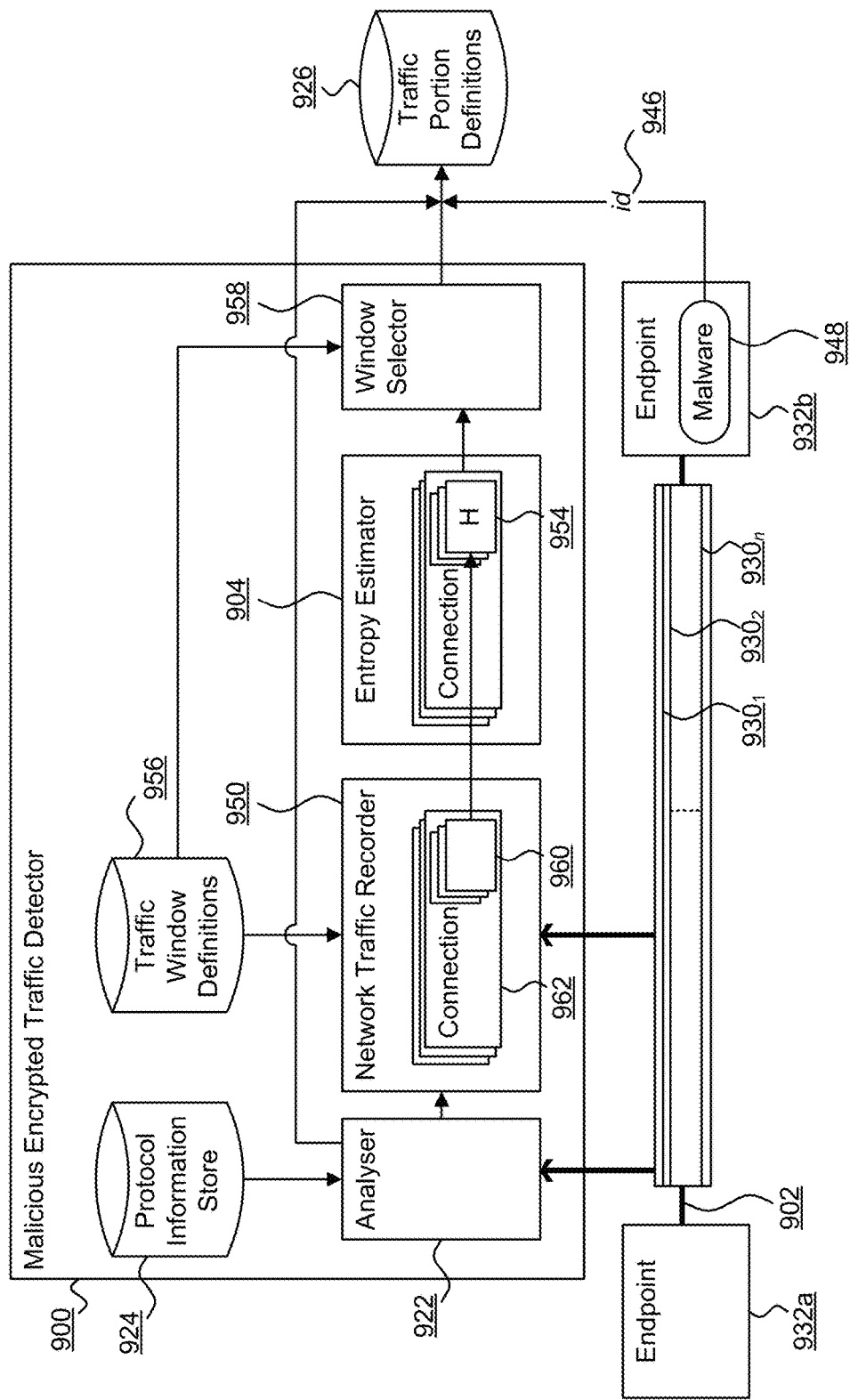
FIG. 9 is a component diagram of a malicious encrypted traffic detector adapted to determine traffic portion definitions for malware in accordance with an embodiment of the present disclosure.

FIG. 9 is a component diagram of a malicious encrypted traffic detector 900 adapted to determine traffic portion definitions 926 for malware 948 in accordance with an embodiment of the present disclosure. The detector 900 is a software, hardware or firmware component operable with a computer network 902 and can constitute all of, part of, or an adapted type of detector such as those described above with respect to FIGS. 2 and 5. Communication endpoints 932a and 932b are network connected devices such as computer systems, pervasive devices, network appliances and the like. Alternatively, the communication endpoints 932a and 932b can be software components such as virtualized computer systems operating within a computer system, such as virtual machines, emulated machines or applications executing within a computer system. At least communication endpoint 932b includes malware 948 as a malicious component such as a malicious software component adapted to communicate with endpoint 932a using encrypted network connections. The malware 948 and network 902 operate in a fashion that is observable by the malicious encrypted traffic detector 900. In use of the detector 900, the malware 948 is observed in operation multiple times to establish and communicate via multiple encrypted network connections $930_1$, $930_2$, $930_n$. For example, the malware 948 can be executed repeatedly, or multiple instances of the malware can be executed. The communication by malware 948 by way of the network connections $930_1$, $930_2$, $930_n$ can be for, inter alia: exchanging data with malware also installed at endpoint 932a; identifying, testing or exploiting a vulnerability at endpoint 932a; communicating encrypted malware or shellcode (such as polymorphic shellcode) to endpoint 932a; receiving information such as data from endpoint 932a; or other reasons as will be apparent to those skilled in the art.

In one embodiment, the encrypted network connections $930_1$, $930_2$, $930_n$ can be loopback network connections between software components executing on a single computing device. For example, the network 902 can be a virtual network in the sense that networking protocols are operable to constitute the network 902 though communications for the network connections $930_1$, $930_2$, $930_n$ do not leave a computing device to travel on physical network media or wirelessly external to the computing device.

The detector 900 includes an analyzer 922, entropy estimator 904 and protocol information store 924 substantially as hereinbefore described with reference to FIG. 5. In an alternative embodiment the detector additionally includes a Fourier transform coefficient evaluator as previously described that can be additional or alternative to the entropy estimator 904 (references hereinafter to the entropy estimator 904 for the evaluation of an estimate measure of entropy applying equally to s Fourier transform coefficient evaluator for the evaluation of coefficients). The detector 900 further includes a network traffic recorder 950 for recording network traffic 960 communicated over a network connection $930_1$, $930_2$, $930_n$, the recording being undertaken in accordance with network traffic window definitions 956 for an application protocol for a network connection determined by the analyzer 922. The network traffic window definitions 956 define windows of network traffic as candidate portions of network traffic for recording by the recorder 950. The candidate portions are used to select a portion as a traffic portion definition 926 for detection of malware according to, for example, the embodiments described hereinbefore with reference to FIG. 5. Each network traffic window definition 956 is specific to a network protocol. In one embodiment, one or more network traffic window definitions 956 can also be specific to, or defined in view of, a particular malware 948, such as in view of known, observed or understood characteristics of a particular malware including application protocol connection setup characteristics and/or vulnerability exploitation characteristics.

Figure 10:
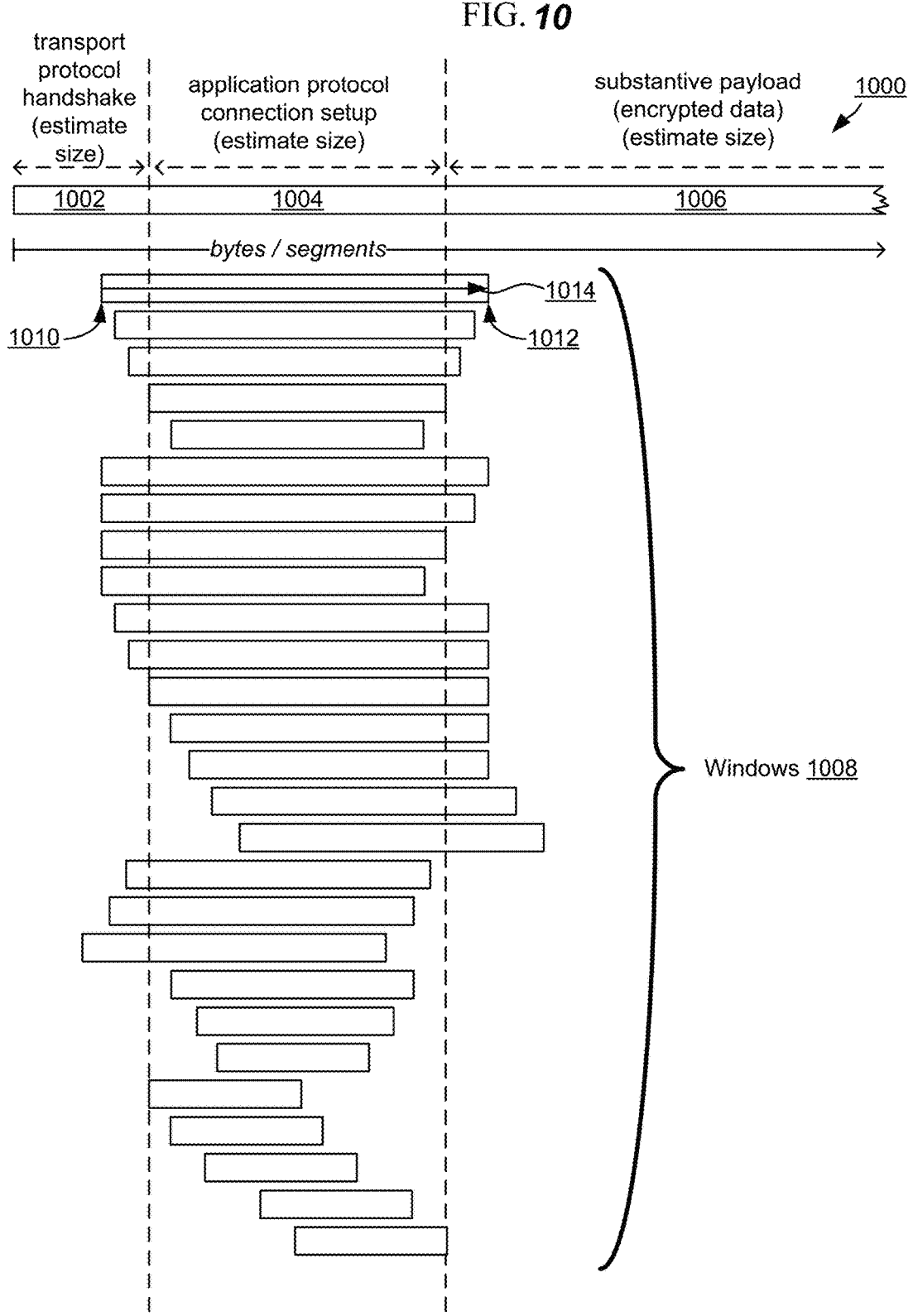
FIG. 10 depicts an exemplary set of traffic window definitions for an application protocol for an exemplary network connection in accordance with an embodiment of the present disclosure.

FIG. 10 depicts an exemplary set 1008 of traffic window definitions for an application protocol for an exemplary network connection 1000 in accordance with an embodiment of the present disclosure. Data communicated via the network connection 1000 of FIG. 10 is generally divided into three parts, each having an estimated size indicated in FIG. 10 (purely illustratively) and including: a transport protocol handshake part, estimated to constitute generally the portion 1002; an application protocol connection setup part, estimated to constitute generally the portion 1004; and a substantive encrypted data payload part, estimated to constitute generally the portion 1006. The exact size, length or extent of each part of the exemplary network connection of FIG. 10 may not be known for a number of reasons. The exact nature of the transport handshake 1002 may not be known since the handshake may range from a minimal number of message or segment exchanges between communicating endpoints and a most protracted number. Similarly, the exact nature and extent of the application protocol connection setup 1004 may also be unknown since part of the connection setup may be encrypted and the exact nature of the application protocol may not be known, and/or the extent of connection setup could range from minimal to protracted. Further, the application protocol setup may constitute part or all of the exploitation process of the malware 948 in exploiting a vulnerability at a target system 932a, and accordingly the nature of such connection setup may be atypical. Consequently, the starting point, ending point and extent of the application protocol connection setup 1004 may not be precisely known. Accordingly, a plurality of window definitions 1008 are predetermined such that each window defines a different subset of network traffic for a network connection with the intention that all windows seek to cover at least part of the application protocol connection setup part 1004 of network traffic for a network connection. Each window can be defined by way of a start point 1010 and an end point 1012, each of the start and end points indicating a location in network traffic for a network connection such as a byte, message, segment or packet offset in network traffic, Alternatively, a start point 1010 and an extent, length or size 1014 can define a window. As depicted in FIG. 10, the windows 1008 are generally defined to span different continuous subsets of network traffic, covering at least a portion of the estimated location of an application protocol connection setup 1004, in order to provide a useful basis for identifying a most promising window as a portion of network traffic for a protocol and/or malware for identifying encrypted network traffic by the malicious encrypted traffic detector 900.

In one embodiment, a primary window is defined, from which the plurality of windows 1008 are derived. Such a primary window is defined to have a size and position based on a predetermined estimate of a size of an application protocol connection setup, and wherein each of the windows in the plurality of windows 1008 has a size in a range of sizes from a first predetermined delta size below the primary windows size to a second predetermined delta size above the primary window size.

Returning to FIG. 9, the network traffic recorder 950 records a subset of network traffic 960 received over a network connection for each applicable window defined in the traffic window definitions 956. Applicable windows are windows associated with a protocol for the network connection. Thus, in use, the recorder 950 records a plurality of subsets of network traffic 960 for each of the malware network connections $930_1$, $930_2$, $930_n$. Each subset of network traffic 960 recorded for a network connection is associated with a particular traffic window definition. In one embodiment, the network traffic recorder 950 accesses network traffic for a network connection $930_1$, $930_2$, $930_n$ only once and copies subsets of the accessed network traffic in accordance with the applicable traffic window definitions 956 to generate the plurality of subsets of network traffic 960. For example, the network traffic recorder 950 can record network traffic from an earliest point in all applicable window definitions to a latest point in all applicable window definitions such that, subsequently, the particular window definitions can be used to extract subsets of the recorded traffic to store network traffic subsets 960 for each window definition.

Figure 11:
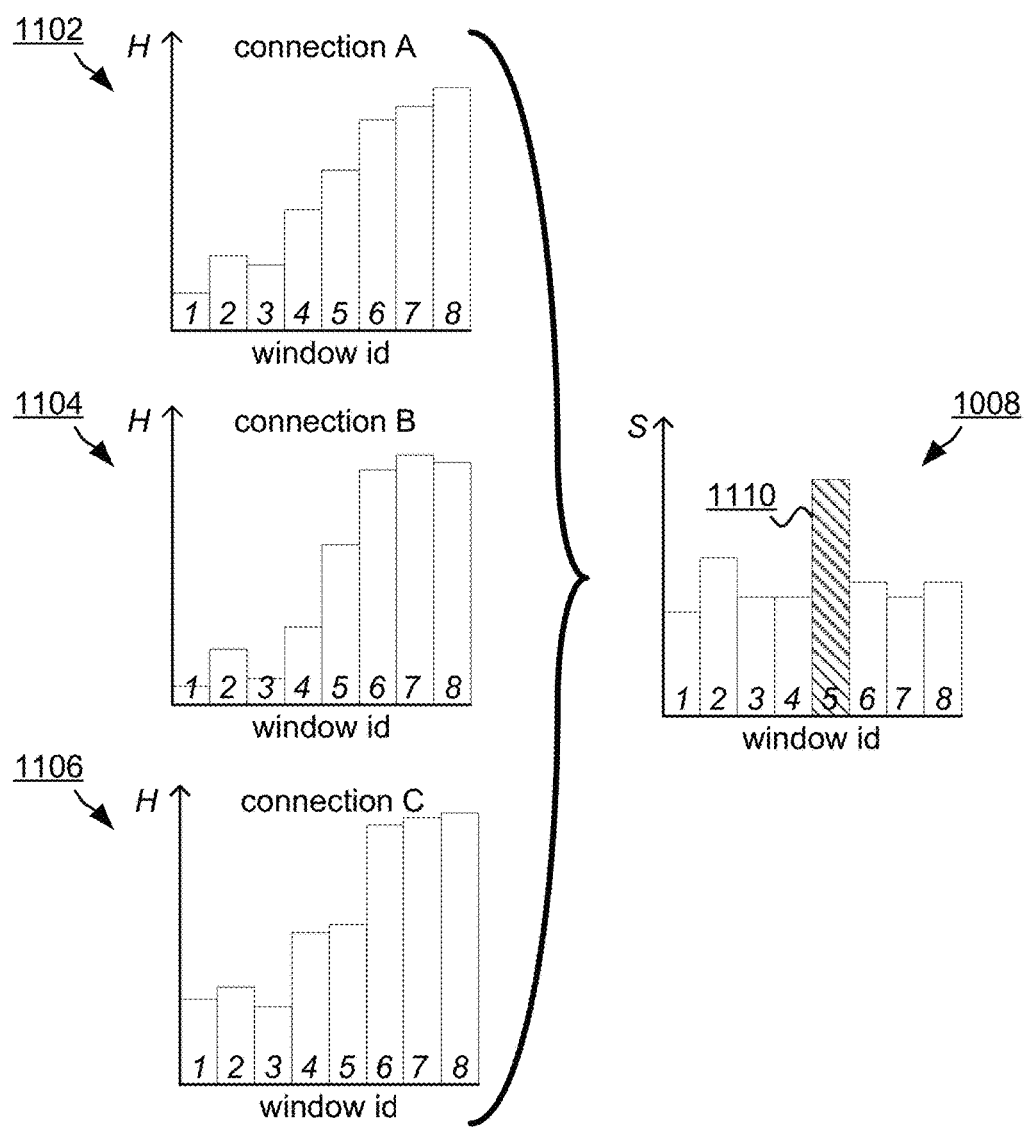
FIG. 11 is a graphical depiction of similarity measures for a plurality of windows across a plurality of connections in accordance with an embodiment of the present disclosure.

The entropy estimator 904 (and/or Fourier transform coefficient evaluator) of FIG. 9 is adapted to evaluate, for each of the subsets of network traffic 960 recorded for each of the connections $930_1$, $930_2$, $930_n$, an estimate measure of entropy ("H") 954 (and/or coefficients). FIG. 11 is an exemplary illustration of estimated measures of entropy evaluated for a plurality of traffic window definitions 956 for a plurality of network connections $930_1$, $930_2$, $930_n$. FIG. 11 illustrates entropy measures for three exemplary network connections A, B and C of malware communicating encrypted network traffic. Each connection has a distribution of evaluated entropy measures (H) for a set of windows, each window being identified by window identifiers ("window id" in a range 1 to 8 in the present example.) The windows for each connection are the same such that the entropy measures for discrete windows of network traffic between connections can be compared.

Returning to FIG. 9, the detector further includes a window selector 958 as a software, hardware or firmware component for identifying a window as a network traffic portion definition for storage in a traffic portion definitions store 926. The traffic portion definitions store 926 is substantially as hereinbefore described with respect to FIG. 5. A window is identified from a set of applicable windows for the malware 948, i.e. windows associated with a protocol for the network connections $930_1$, $930_2$, $930_n$ and for which estimated measures of entropy H are evaluated by the entropy estimator 904. A window is identified by the window selector 958 as a window for which an estimated measure of entropy across a plurality of network connections $930_1$, $930_2$, $930_n$ is most similar. In one embodiment, the window selector 958 evaluates a measure of similarity of entropy measures for each window across a plurality of network connections $930_1$, $930_2$, $930_n$ to identify a window with most consistently similar measures of entropy. Thus, in such an embodiment, windows can be ranked by the measure of similarity to identify a most consistently similar window. Techniques for measuring similarity between entropy measures will be apparent to those skilled in the art and can include, for example, similarity functions or inverse distance metrics, such as similarity measures based on Euclidean distance. Clustering algorithms could also be employed to gauge the similarity of a plurality of entropy measures. Notably, where more than two network connections are used to evaluate window entropy measures, consistency or deviation of the degree of similarity between entropy measures for a window becomes pertinent. That is to say that the relative similarity of all measures of entropy for a window can be measured, and a window having measures of entropy that are most similar overall is identified by the window selector 958. In this regard, embodiments of the disclosure employ clustering algorithms such as, inter alia, k-means algorithms, distribution-based clustering algorithms and/or density-based clustering algorithms to identify clusters of entropy measures among all entropy measures for a window. Such clustering algorithms can be adapted to identify windows having most tightly clustered entropy measures as windows having most consistently similar entropy measures. For example, entropy measures for a window that can all be clustered into a single cluster constitute similar entropy measures. Windows having such similar entropy measures can be me measured for a degree or consistency of similarity between the entropy measures. One technique for achieving this involves measuring the variability or deviation of the entropy measures in the cluster. For example, a maximum, average or most frequent deviation from a central, average, mean or median entropy measure can be used as a measure of the degree or consistency of similarity of all entropy measures in a cluster for a window. Other suitable techniques for measuring and comparing relative degrees of similarity and consistency of entropy measures for a window will be apparent to those skilled in the art.

Thus, the window selector 958 identifies a window determined to have a greatest degree of consistent similarity of entropy measures across multiple malware network connections $930_1$, $930_2$, $930_n$. Returning to FIG. 11, a graphical depiction of similarity measures, S 1008, for each window across all network connections is shown. It can be seen that a most consistently similar window 1110 is identified by the window selector 958 and used to generate a new traffic portion definition 926. In practice, such an identified window may be consistently similar for both malicious encrypted network traffic and also for genuine or non-malicious network traffic. For example, a window may be identified by the window selector 958 that is always identical for all network connections (whether malicious or not) for a particular application protocol. Such a window is not suitable for use in the detection of malicious encrypted network traffic since such a window would always exhibit consistent characteristics and the measure of entropy may stay substantially the same irrespective of the nature of a network connection. Accordingly, it is preferable that the window selector 958 further undertakes a process of elimination of windows identified by the window selector 958 to exclude from the identification windows having entropy measures for known malicious encrypted traffic that are similar, by some predetermined degree of similarity or clustering, to entropy measures for known non-malicious traffic. The process of elimination is based on non-malicious traffic relating to communications using the same application protocol as that for the known malicious network traffic. Thus, the identification of a portion as a window can be based on a determination that evaluations of estimated entropy measures of the window are inconsistent between malicious encrypted network traffic and non-malicious network traffic such that a window for which estimated entropy measures are substantially similar for malicious and non-malicious traffic are eliminated from selection as a portion for malicious encrypted network traffic detection.

On identification of a portion by the window selector 958, a traffic portion definition 926 is generated for use by the methods and apparatus hereinbefore described to detect malicious encrypted network traffic on a network. Additionally, the process of identifying a window for a traffic portion definition 926 by the window selector 958 further includes the identification of typical entropy values for encrypted network traffic occurring in the window. Accordingly, the portion identification by the window selector 958 is suitable also for defining records in the dictionary data store 508 as reference measures or reference ranges of entropy as described with respect to FIG. 5. In particular, reference entropy measures in the dictionary data store 508 can be defined for an application protocol and malware 948 based on the entropy measures, or range of entropy measures, for the identified window. Thus, preferably, the window selector 958 further stores, in a dictionary 508, a reference measure of entropy in association with an identifier of the malicious software component 948, the reference measure being derived from the estimated measures of entropy for the identified window for each of the network connections $930_1$, $930_2$, $930_n$.

The relative degree of similarity of all entropy measures for a window is further informative of the degree of similarity, or margin of error, that is permitted when employing a traffic portion definition 926 in the identification of malicious encrypted traffic. That is to say the extent to which entropy measures for a window across a plurality of network connections $930_k$, $930_2$, $930_n$ are consistently similar when defining traffic portion definitions 926 informs a determination of an extent to which an entropy measure for a connection setup portion of an encrypted network connection must be similar to the traffic portion entropy measure to conclude that the connection is malicious. Thus, where the window selector 958 evaluates entropy measures for a window of network traffic for known malware 948 as having a high degree of similarity, the subsequent use of the window as a traffic portion definition 926 to detect malicious traffic in a production environment will require a correspondingly high degree of similarity with the reference measure of entropy in the dictionary.

Figure 12:
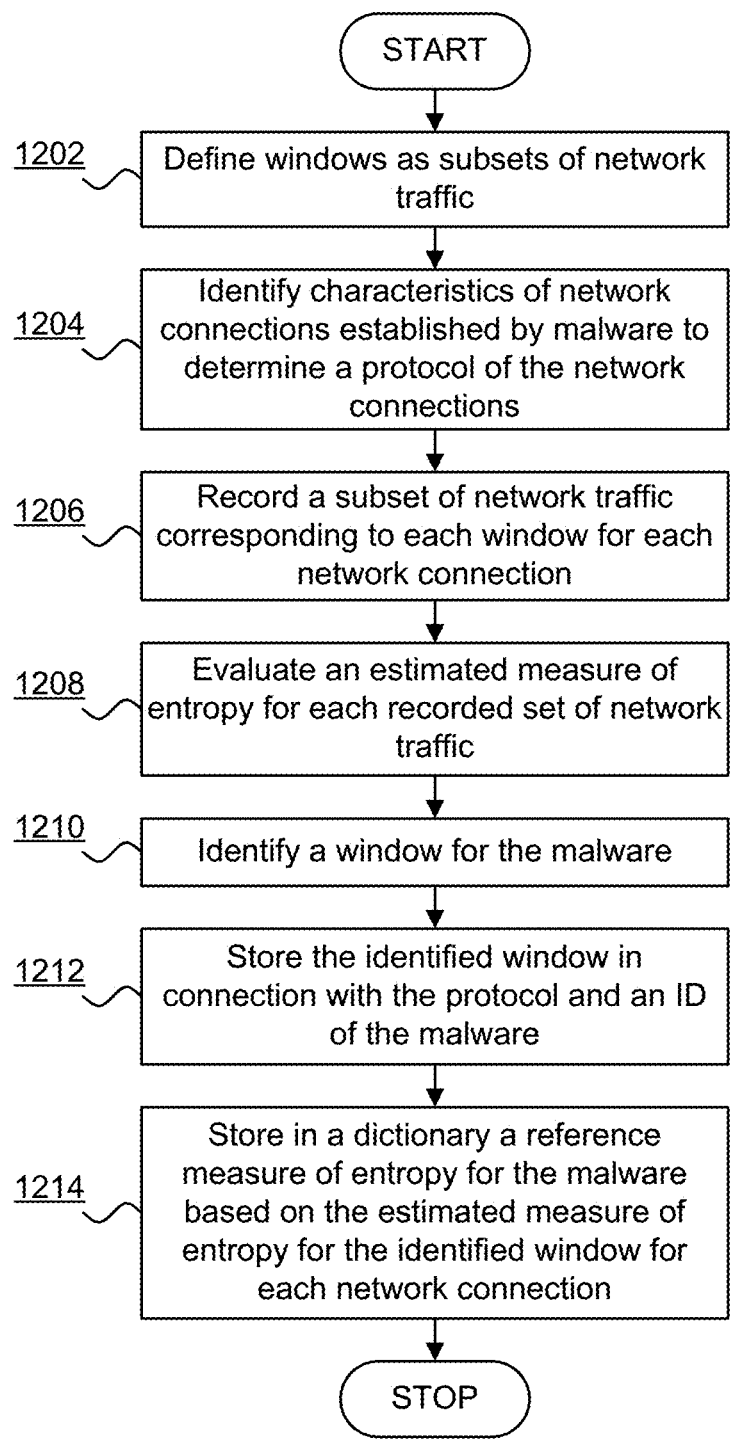
FIG. 12 is a flowchart of a method of the detector of FIG. 9 for defining traffic portion definitions for malware in accordance with an embodiment of the present disclosure.

FIG. 12 is a flowchart of a method of the detector of FIG. 9 for defining traffic portion definitions 926 for malware 948 in accordance with an embodiment of the present disclosure. Initially, at 1202, traffic window definitions 956 are defined as subsets of network traffic. At 1204 the analyzer 922 identifies characteristics of the network connections $930_1$, $930_2$, $930_n$ established by the malware 948 with reference to a protocol information store 924 to determine a protocol of the network connections $930_1$, $930_2$, $930_n$. At 1206 the recorder 950 records a subset 960 of network traffic corresponding to each window applicable to the determined protocol for each network connection $930_1$, $930_2$, $930_n$. At 1208 the entropy estimator 904 evaluates an estimated measure of entropy 954 for each recorded set of network traffic. At 1210 the window selector 958 identifies a portion of malicious encrypted network traffic as a window corresponding substantially to a connection setup portion of a malicious network connection using an application protocol for characterizing the malicious network connection. The portion is stored in the traffic portion definitions 926. At 1214, a reference measure (or range of measures) of entropy for the portion of malicious encrypted network traffic for the malware 948 is added to the dictionary 508 based on the estimated measures of entropy for the identified window across the plurality of network connections $930_1$, $930_2$, $930_n$. In alternative embodiments the method of FIG. 12 is adapted to include additionally or alternatively the evaluation of a Fourier transform coefficient for each of multiple elements (e.g. bytes) in each recorded set of network traffic at 1208; and to store in the dictionary a reference set of coefficients for the malware based on the evaluated Fourier transform coefficients at 1214.

Figure 13:
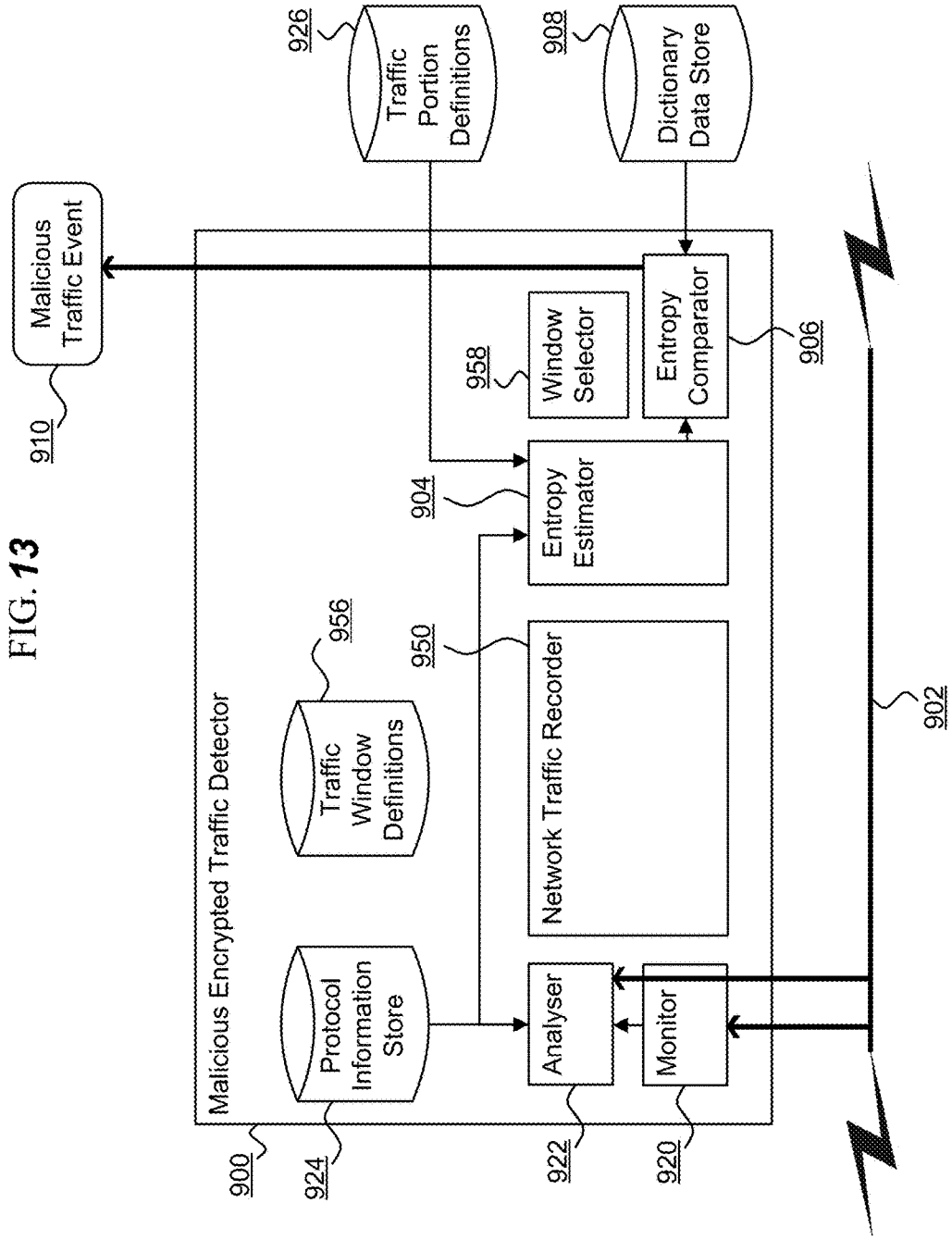
FIG. 13 is a component diagram of the malicious encrypted traffic detector of FIG. 9 configured to identify malicious encrypted network traffic communicated via a computer network in accordance with an embodiment of the present disclosure.

FIG. 13 is a component diagram of the malicious encrypted traffic detector 900 of FIG. 9 configured to identify malicious encrypted network traffic communicated via a computer network 902 in accordance with an embodiment of the present disclosure. In particular, the detector 900 of FIG. 13 further includes a monitor 920 and dictionary data store 908 substantially as hereinbefore described with respect to FIG. 5. Thus, completion of the method of FIG. 12 for potentially multiple known malware components or exploits, traffic portion definitions 926 and a dictionary 908 are generated in order that monitored network traffic communicated via the network 902 can be assessed for malicious encrypted network traffic by comparison of estimated measures of entropy with reference measures stored in the dictionary 908. On identification of malicious encrypted network traffic by the comparator 906, a malicious traffic event 910 is generated for triggering or instigating remedial, preventative, communicative or protective measures, examples of which are further described below.

Figure 14:
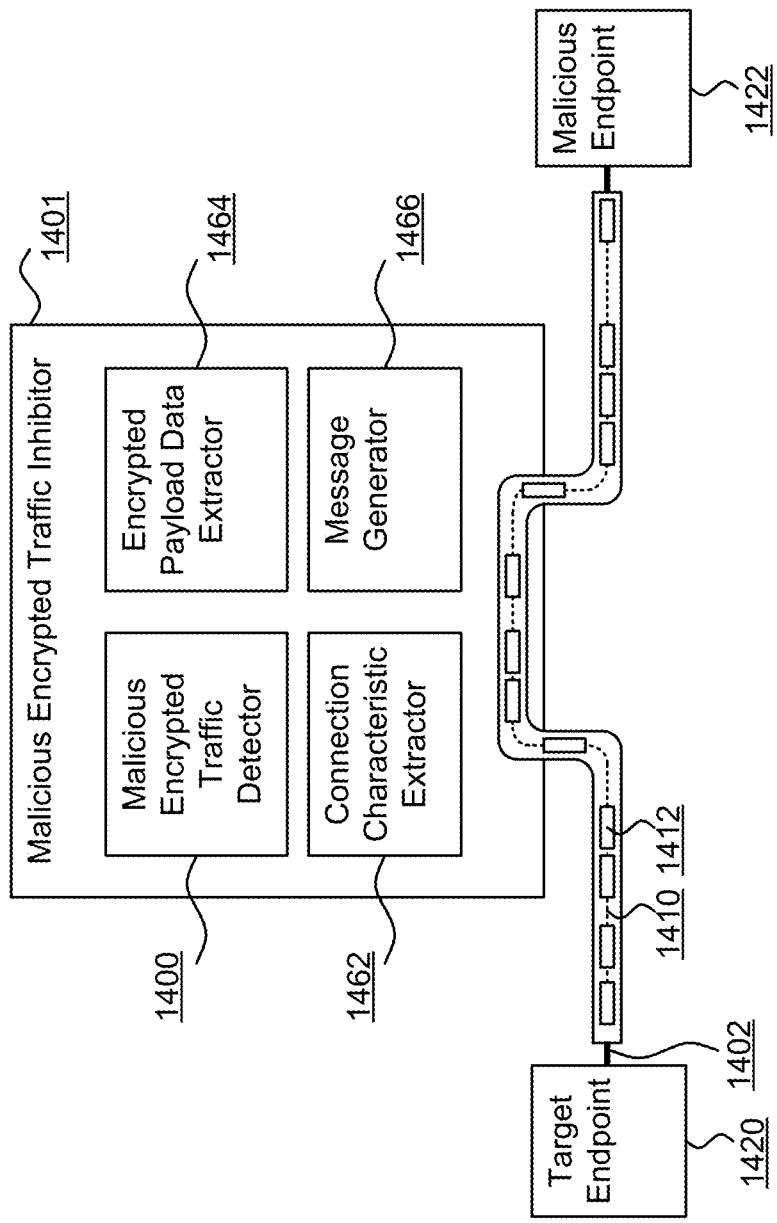
FIG. 14 is a component diagram of a malicious encrypted traffic inhibitor configured to identify and inhibit malicious encrypted network traffic communicated via a computer network in accordance with an embodiment of the present disclosure.

FIG. 14 is a component diagram of a malicious encrypted traffic inhibitor 1401 configured to identify and inhibit malicious encrypted network traffic communicated via a computer network 1402 in accordance with an embodiment of the present disclosure. A network connection 1410 is initiated via the computer network 1402 for communication of malicious encrypted network traffic including network messages 1412 such as packets, segments or the like between a malicious endpoint 1422 and a target endpoint 1420. The malicious endpoint 1422 is a computer system executing malicious software such as malware for the exploitation of vulnerabilities in other computer systems such as the target endpoint 1420. The malicious endpoint 1422 may itself have a target of malicious activity such as vulnerability exploitation, leading to its status as a malicious endpoint 1422. A malicious encrypted traffic inhibitor 1401 is a network connected software, hardware or firmware component operable to intercept, sniff or otherwise access messages 1412 communicated via the computer network 1402. The malicious encrypted traffic inhibitor 1401 includes a malicious encrypted traffic detector 1400 such as has been hereinbefore described in numerous embodiments including, inter alia, with respect to FIGS. 2, 5 and 9. Additionally, the malicious encrypted traffic inhibitor 1401 includes a connection characteristic extractor 1462, an encrypted payload data extractor 1464 and a message generator 1466 as software, hardware or firmware components provided as part of, in association with or accessible to the malicious encrypted traffic inhibitor 1401.

The connection characteristic extractor 1462 is operable in response to the malicious encrypted traffic detector 1400 to extract connection characteristics from network traffic for the network connection 1410. In particular, the connection characteristics include information suitable for communicating with the malicious endpoint 1422 of the network connection 1410. In one embodiment, the network connection includes an application network protocol operating via a transport protocol such as the transmission control protocol (TCP). TCP communications are conducted as a series of segments having a header portion and a payload (body) portion. Connection characteristics are maintained in the header portion of TCP segments and include address information for source and destination endpoints for a segment. Furthermore, TCP operates as a sequenced protocol such that each byte in each segment for a network connection is numbered in sequence. In this way TCP messages received at a receiving endpoint can be aggregated in a correct order and absent, missing or delayed messages can be identified for resend. This is achieved by including a sequence number field (SEQ) in the header of each TCP segment identifying the sequence number in the network connection of a first byte in the segment. Further, each TCP segment includes an acknowledgment (ACK) field indicating the sequence number of the next byte expected from a remote endpoint. In this way, the SEQ and ACK fields, in conjunction with the process of synchronization at TCP handshake described hereinbefore, serve to provide proper sequencing of bytes and messages communicated via a TCP network connection. Accordingly, such fields along with network address information constitute connection characteristics for the network connection 1410. These connection characteristics are suitable for communicating with the malicious endpoint 1422 since they provide address information for the endpoint along with up-to-date sequence information. Thus, the malicious encrypted traffic inhibitor 1401, by way of the connection characteristics extracted from messages accessed thereby, has information required to partake in the network connection 1410 that is otherwise established between the malicious endpoint 1422 and the target endpoint 1420. The undertaking of such communication by an entity that is not an endpoint or party to a network connection is known as TCP/IP hijacking as will be familiar to those skilled in the art. TCP/IP hijacking is a form of attack or exploitation normally undertaken with malicious intent. In contrast, embodiments of the present disclosure employ a similar technique as a mechanism for inhibiting the distribution, operation or network communication of malicious software engaged in communicating encrypted network traffic.

The encrypted payload data extractor 1464 is operable in response to the malicious encrypted traffic detector 1400 to extract at least a sample or subset of encrypted payload data from network traffic for the network connection 1410. For example, such encrypted payload can be carried in a payload or data section of one or more messages 1412, such as one or more TCP segments. For example, the encrypted payload may be discerned based on an estimated measure of entropy of the payload data on the basis that an estimate measure of entropy for encrypted data will tend towards entropy of a random sample (tending towards maximum indeterminacy). In some embodiments, a sizeable or complete sample of encrypted malicious payload is extracted, being of a size suitable for transmission as part of one or more network message such as a TCP segment. In some embodiments, complete encrypted data payload information is extracted in binary form. It is not necessary to decrypt the encrypted network traffic payload since its purpose is to constitute all or part of a payload for a new message generated by the message generator 1466 and communicated to the malicious endpoint 1422. The encrypted payload, when communicated to the malicious endpoint 1422, will be recognizable to the malicious endpoint 1422 at least insofar as it is encrypted using an encryption scheme, mechanism, key or process recognizable to the malicious endpoint 1422 since it originated as part of the existing communication between the malicious endpoint 1422 and the target endpoint 1420. Thus it will appear plausible, to the malicious endpoint 1422, that messages including the encrypted data are expected network traffic as part of the network connection between the malicious endpoint 1422 and the target endpoint 1420. In one embodiment, the encrypted payload data extractor 1464 extracts encrypted payload originating from the target endpoint 1420. This is particularly beneficial if it is likely or known that an asymmetric encryption scheme is used in the communication between the malicious endpoint 1422 and the target endpoint 1420. Where a symmetric encryption scheme is employed for the malicious encrypted network traffic, encrypted payload from either the malicious endpoint 1422 or target endpoint 1420 is suitable.

Figure 15:
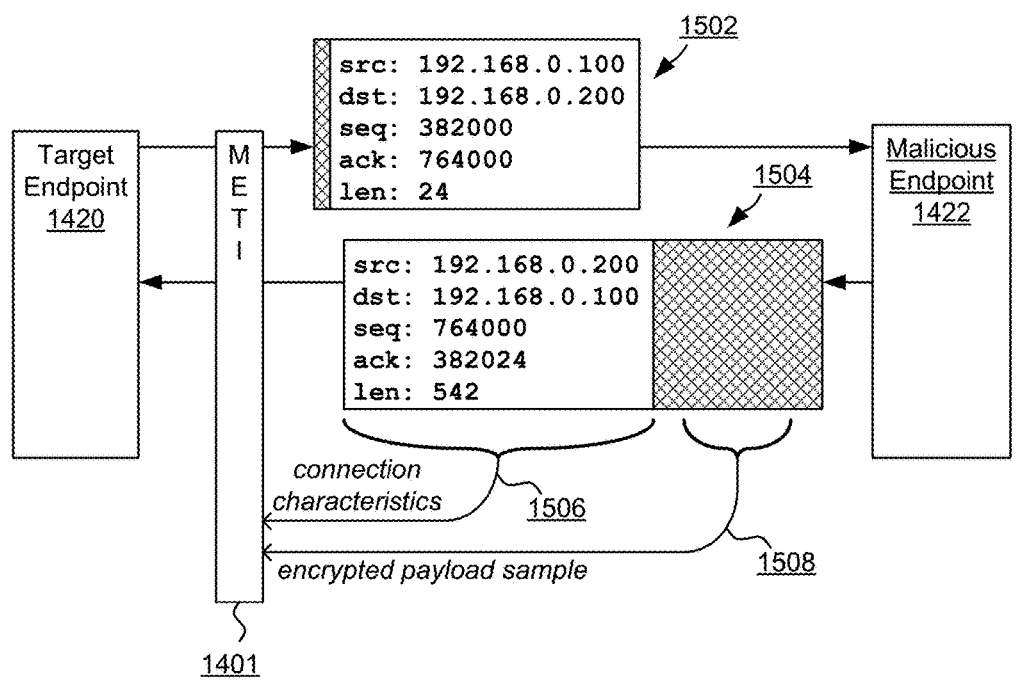
FIG. 15 is a schematic diagram of a TCP network connection between a malicious endpoint and a target endpoint in accordance with an embodiment of the present disclosure.

FIG. 15 is a schematic diagram of a TCP network connection between a malicious endpoint 1422 and a target endpoint 1420 in accordance with an embodiment of the present disclosure. The malicious encrypted traffic inhibitor 1401 (METI) is operable to access TCP segments communicated via the TCP network connection. An initial message 1502 transmitted by the target endpoint 1420 includes a TCP header having: source (SRC) and destination (DST) addresses; a sequence number field (SEQ); an acknowledgement field (ACK); and a length (LEN). A second message 1504 transmitted by the malicious endpoint 1422 includes a similar header and a more substantial payload (hatched) including encrypted malicious data, such as malware software, an encrypted shellcode and exploitation code, or other malicious encrypted data. A connection characteristic extractor of the malicious encrypted traffic inhibitor 1401 is adapted to retrieve connection characteristics 1506 from a header of the message 1504 received from the malicious endpoint 1422. Further, the encrypted payload data extractor is adapted to retrieve a sample of the encrypted payload 1508 from the payload of the message 1504 received from the malicious endpoint 1422. In this way the malicious encrypted traffic inhibitor 1401 has information required to generate messages for transmission to the malicious endpoint 1422 that would appear to plausibly relate to the network connection between the malicious endpoint 1422 and the target endpoint 1420. That is to say that such messages can include at least relevant and appropriate address, sequence (SEQ) and acknowledgement (ACK) information and can further include payload data being encrypted using an encryption scheme recognizable as relating to the network connection.

Returning to FIG. 14, the message generator 1466 is operable in response to the malicious encrypted traffic detector 1400 to generate a plurality of network messages for transmission to the malicious endpoint 1422. The generated network messages include characteristics based on or derived from the connection characteristics extracted by the connection characteristic extractor 1462, and further including payload data as encrypted malicious network traffic payload data based on or derived from data extracted by the encrypted payload data extractor 1464. Accordingly, the messages generated by the message generator 1466 will appear, to the malicious endpoint 1422, to plausibly relate to the network connection for communicating malicious encrypted network traffic. In one embodiment, the message generator 1466 generates sufficient messages that, when the messages are transmitted to the malicious endpoint 1422, the malicious endpoint 1422 becomes substantially consumed by the need to process the messages in view of the messages being plausibly related to the network connection and each requiring receipt, decryption and potentially a response. In this regard, a balance can be struck by a number (quantity) of messages for transmission to the malicious endpoint 1422 and a size (length) of each message, determined by the size of the encrypted payload.

Figure 16:
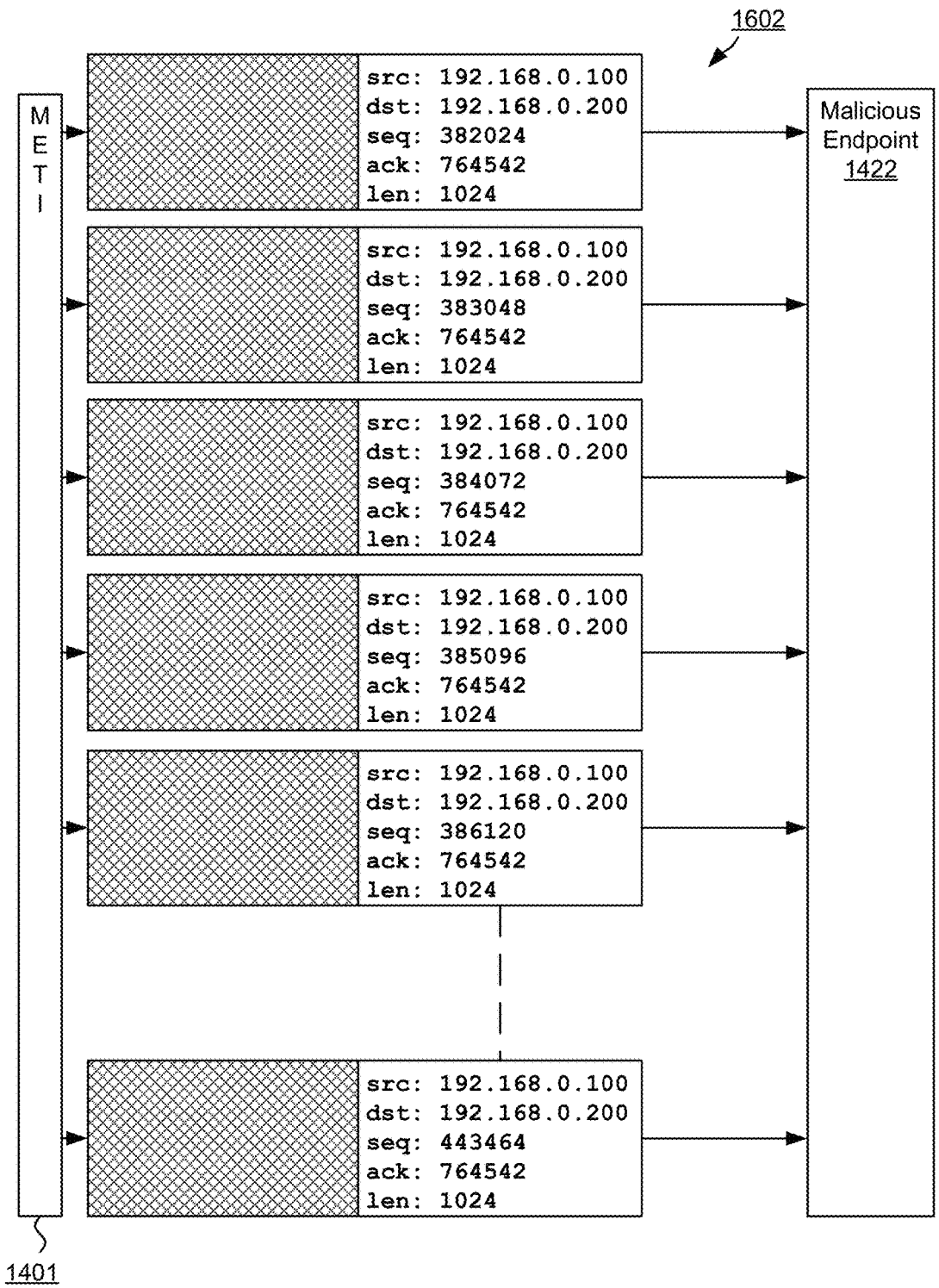
FIG. 16 is a schematic diagram of a TCP network connection between a malicious endpoint and the malicious encrypted traffic inhibitor in accordance with an embodiment of the present disclosure.

FIG. 16 is a schematic diagram of a TCP network connection between a malicious endpoint 1422 and the malicious encrypted traffic inhibitor 1401 in accordance with an embodiment of the present disclosure. The messages illustrated in FIG. 16 occur subsequent to the messages and occurrences of FIG. 15. In FIG. 16, the message generator 1466 of the malicious encrypted traffic inhibitor 1401 generates a plurality of messages 1602 each including appropriate SRC and DST address information for the network connection between the malicious endpoint 1422 and the target endpoint 1420. Further, each message includes accurate and up-to-date SEQ and ACK fields. Each message includes a payload part having encrypted payload data being based on, or copied from, data extracted by the encrypted payload data extractor 1464. Thus, in use, the malicious endpoint 1422 receives a considerable number of TCP segments being plausibly related to the network connection established with the target endpoint 1420. Each segment includes appropriate address and sequencing information and each payload is encrypted with a recognizable encryption algorithm and using a known key. Accordingly the malicious endpoint 1422 sets about receiving, logging, interpreting and decrypting these many messages in a process that occupies the malicious endpoint 1422 so as to distract the malicious endpoint 1422 by consumption of resources of the malicious endpoint 1422. In parallel to such consumption of the malicious endpoint's 1422 resources, the malicious encrypted traffic inhibitor 1401 can communicate with or notify the target endpoint 1420 of the malicious encrypted network traffic and/or cease, prevent or trigger a process of protecting against further traffic. Thus, by virtue of both these activities the malicious encrypted traffic inhibitor 1401 serves to inhibit the ability of the malicious endpoint 1422 to generate and communicate malicious encrypted network traffic via the network connection, at least until the messages generated by the message generator 1466 cease to be transmitted.

The use of encrypted network traffic based on malicious encrypted messages accessed on a computer network is particularly beneficial and an improvement over known denial-of-service type methods for affecting remote network connected systems. Existing denial-of service methods such as SYN flooding, 'the ping of death', 'teardrop', 'ping flooding', amplification attacks and distributed versions of any of these (distributed denial-of-service attacks) are well established and methods for protecting against such attacks are increasingly prevalent (for example, Linux operating systems employ 'syncookies' to prevent SYN flood attacks). However, methods of the present disclosure employ messages based on real network traffic to increase the plausibility of communications received by the malicious endpoint 1422 so much so that the messages cannot be readily questioned until the scale of resource consumption is so great that the resource consumption itself becomes an indicator that a denial-of-service type effect is being realized at the malicious endpoint 1422. Notably, malicious systems such as malicious endpoint 1422 are typically developed to aggressively communicate with as many other systems as possible to maximize the propagation and effect of distributed and executing malware. Accordingly the propensity for such malicious systems to fall foul of high volume messages of the sort described hereinabove, with the consequence that the malicious systems cease to be effective in their distribution of, or communication with, malware, renders the approach of embodiments of the present disclosure particularly advantageous.

Figure 17:
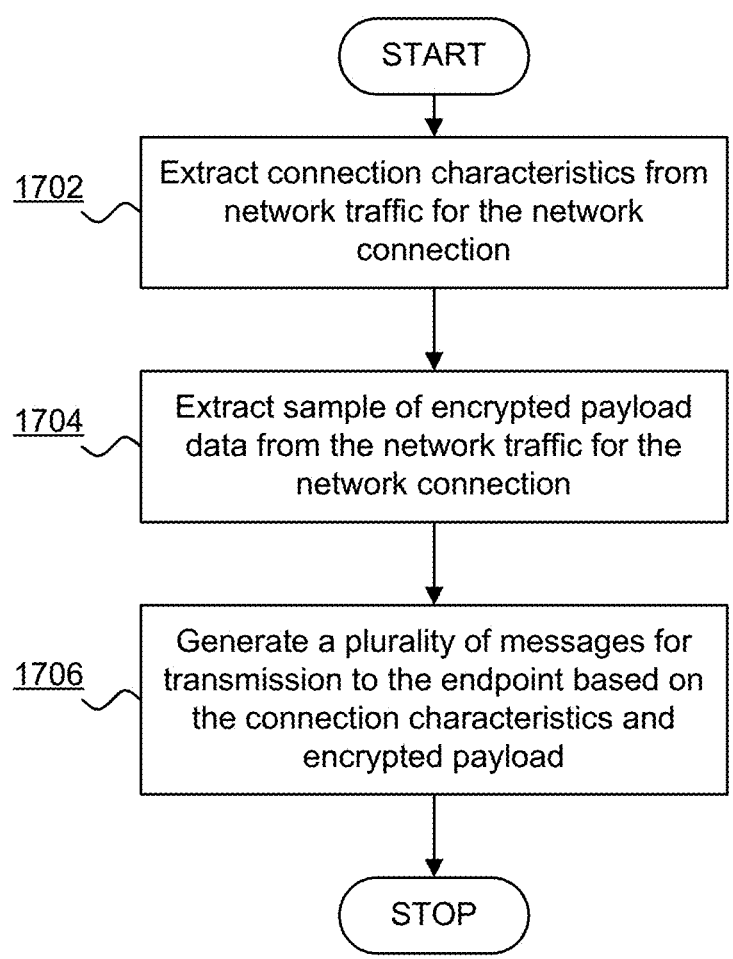
FIG. 17 is a flowchart of a method of the malicious encrypted traffic inhibitor in accordance with an embodiment of the present disclosure.

FIG. 17 is a flowchart of a method of the malicious encrypted traffic inhibitor 1401 in accordance with an embodiment of the present disclosure. The method of FIG. 17 is applicable also by way of extension to the embodiments described hereinbefore with respect to FIGS. 6b and 12 and the arrangements of FIGS. 2, 5, 9 and 14. Initially, at 1702, the connection characteristic extractor 1462 extracts connection characteristics from malicious encrypted network traffic, such as messages, packets, segments or the like, communicated via a computer network. At 1704 the encrypted payload data extractor 1464 extracts at least a sample of encrypted payload from malicious encrypted network traffic, such as messages, packets, segments or the like, communicated via a computer network. Finally, at 1706, the message generator 1466 generates a plurality of messages for transmission to a malicious endpoint 1422, each of the messages being characterized by the extracted connection characteristics and including a payload derived from the extracted sample of encrypted payload data so as to overwhelm the malicious endpoint 1422 with messages plausibly relating to the malicious network connection in order that the malicious endpoint 1422 substantially ceases to engage in malicious network communication with the target endpoint 1420.

As previously described, in addition or as an alternative to entropy evaluation, Fourier transform coefficients can be evaluated to detect potentially malicious communication based on determined traffic window definitions. A Fourier transform coefficient evaluator can calculate coefficients for network traffic using the following formula:

$$X_k = \frac{1}{N}\sum_{0}^{N-1} x[n] * e^{-j\frac{2\pi}{N}nk} = \frac{1}{N}\sum_{0}^{N-1} x[n] * \left(\cos\left(\frac{2\pi}{N}nk\right) - j\sin\left(\frac{2\pi}{N}nk\right)\right)$$

in which: N is a number of data elements such as a number of bytes in the traffic window; x[n] is an identifier of an nth byte (where each byte has 8 bits so there are $2^8=256$ possible combinations); k=0, 1, 2, . . . (N−1); and j is the imaginary unit or unit imaginary number. Frequencies in Hz are (+ or −) k/N and corresponding Fourier transform coefficients are values of $X_k$.

Thus in one embodiment a Fourier transform coefficient evaluator evaluates coefficients for each byte x[n] in a data traffic window of N bytes. Thus, considering a window of 3 bytes (N=3) as follows:

| Byte | Byte Identifier (value) |
|---|---|
| 1 | 01010101 (85) |
| 2 | 00010000 (16) |
| 3 | 00000101 (5) | such that x[n]={85,16,5}, coefficients X can be evaluated as:

| k | $X_k$ | $X_k^2$ | Frequency k/N |
|---|---|---|---|
| 0 | 35.3 | 1246.09 | 0 |
| 1 | 74.5 + j18 | 5874.25 | 1/3 |
| 2 | 74.5 − j18 | 5874.25 | 2/3 |

X provides a set (e.g. array) of N coefficients corresponding to the elements (bytes) in the network traffic window. Where such coefficients are evaluated for known malicious network traffic and stored, such as in a store 208 or dictionary 508, such coefficients are suitable for comparison with coefficients similarly evaluated for network traffic to identify potential malicious network traffic. Notably it can be advantageous to compare squared values of coefficient in view of the imaginary unit j.

One feature of the use of Fourier coefficients is that a coefficient is evaluated for each element (such as each byte) in the selected portion of network traffic. This is the case for both a reference set of coefficients such as may be stored in a dictionary, and also for coefficients evaluated for network traffic for which a determination is to be made as to whether the network traffic may be malicious. Thus profiling of the malicious network traffic can take place on a byte-by-byte basis. For Fourier transform coefficient evaluation the requirement for a discrete series necessitates the division of the traffic portion, such as into bytes. Notably the same approach could equally be adopted for entropy evaluation such that a dictionary contains reference entropy values on discrete element bases, such as byte-by-byte, and entropy is estimated per element (e.g. per byte) for comparison with such reference values.

Figure 18:
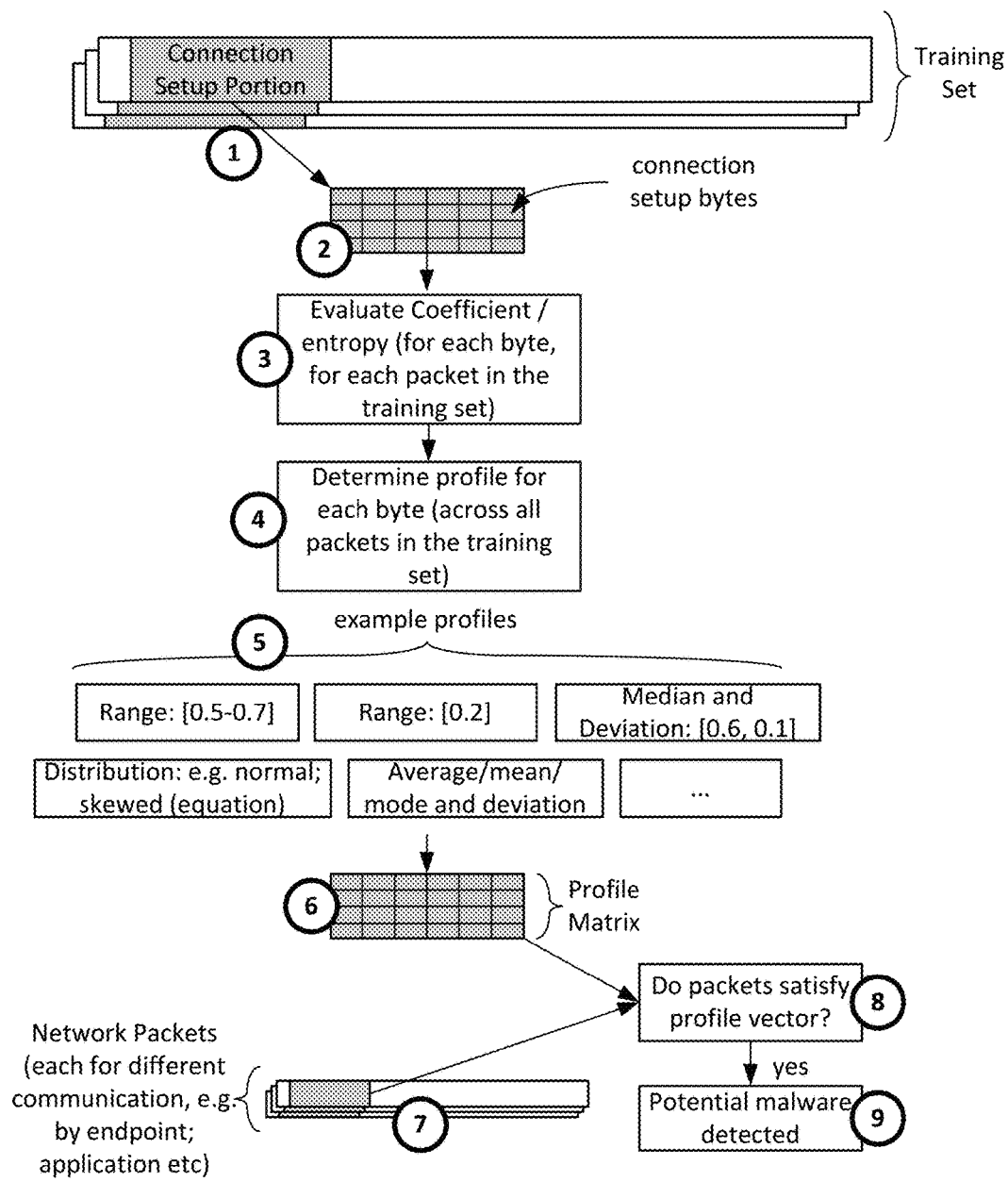
FIG. 18 illustrates an overview of a process according to embodiments of the present disclosure.

FIG. 18 illustrates an overview of a process according to embodiments of the present disclosure. A training set of network packets (1) including connection setup portions (and thus relating to different network connections) is initially provided. The training set of network packets relate to known malicious network communication that is encrypted such that the network connection setup portion may be partly encrypted. Each connection setup portion (such portion being identified, for example, using techniques described above) constitutes an array or matrix of connection setup bytes (2), for each byte for which a Fourier transform coefficient is evaluated (3) (or, alternatively, for which a measure of entropy is evaluated). Such evaluations can occur across the entire training set. Notably the evaluations can occur for each of a particular known malware generating the training set such that a profile is generated for each particular type of malicious network traffic (such as for each type or item of malware). Subsequently a profile is generated (4) for each byte based on the evaluations at (3). The profile can take one of a number of exemplary forms including: a specific range of (coefficient/entropy) values which may or may not be normalized, such as [0.5-0.7]; a particular deviation such that a number, proportion or all coefficients for network traffic occurring for a particular malware always have values that never deviate from each other beyond the specified deviation; median, average, mode, mean values with a specified deviation; a specified distribution—such as can be specified formulaically, such as a skewed-normal distribution about a particular mean specified by an equation or a distribution that is modeled or approximated by a polynomial expression and the like. Bytes for which no meaningful profile can be discerned can be undefined or defined to have a broadest profile (e.g. a normalized range [0.0-1.0]).

The profile for each byte can be used to generate or form an 'image' profile (or profile matrix) (6) for the malware traffic (connection setup portion) which can be used to assess (8) whether a set of network packets having connection setup portions (i.e. multiple network communications with a particular endpoint; on a particular port; using a particular protocol; with a particular application etc.) conform, on a byte-by-byte basis, to the profile matrix (6) and, where they do conform (such as to some predetermined degree or extent of conformance), then potential malware is flagged (9).

Thus the profile matrix (6) has, for each byte in a connection setup portion, a profile such as any of the profiles indicated at (5) and described above. For example, the matrix could be an image of ranges of coefficient or entropy values which may be normalize. Such an image can employ pixel characteristics such as grey-scaling such that grey-scale values represent the range white meaning broadest range [0-1] (i.e. no significant profile pattern) and shades closer to black meaning narrower ranges (i.e. more particular values). In one embodiment colors of pixels can be employed and/or pixel intensity attributes to represent profiles for bytes in connection setup portions such as particular values of coefficient/entropy, median values, deviation, averages, means, modes, ranges, minima, maxima and the like.

FIG. 19a illustrates an exemplary profile image 1900 for each of a series of bytes in a connection setup portion of malicious network traffic in accordance with an embodiment of the present disclosure. The profile image 1900 is a matrix such as a raster or bitmapped image in which each pixel is represented by a combination of red (R) 1902, green (G) 1904 and blue (B) 1908 components such that each pixel has a resulting red/green/blue (RGB) color, each color component having a range 0 to 255. The particular values of R, G and B correspond to different profile attributes for a byte in the connection setup portion to which a pixel corresponds. For example: value R can correspond to a mean Fourier transform coefficient value normalized in the range 0 to 255; value G can correspond to a maximum negative deviation from the mean normalized in the range 0 to 255; and value B can correspond to a maximum positive deviation from the mean normalized in the range 0 to 255. Alternative meanings can be applied to each color component of the RGB pixels. In one embodiment, multiple different configurations of RGB values are used depending on a suitable profile for each different byte in the connection setup portion of malware traffic. For example, a first byte might typically exhibit normalized coefficient/entropy values about a mean value of 100 with a maximum deviation of 10. Such a byte can be profiled by simply identifying the mean and deviation values. A profile employing a mean and deviation value where a pixel R value corresponds to the mean and a pixel G value corresponds to the deviation can be identified as profile 1. The profile identifier can itself be encoded in the pixel B value so that, at runtime, the meaning of the R and G values can be determined. Other alternative profile types can therefore be employed within the same profile matrix (image), distinguished by the pixel B value itself.

FIG. 19b illustrates an exemplary profile image showing different color components for each of a series of bytes in a connection setup portion of malicious network traffic in accordance with an embodiment of the present disclosure. The different shadings or hatchings in FIG. 19a are intended to represent different RGB configurations.

One advantage of employing profile matrices or images to represent reference sets of coefficients or bytewise entropy values is that machine learning algorithms can be readily employed to represent malware profiles and quickly identify potential malware in new network communication with reference to the connection setup portion of the network communication. FIG. 20 is a component diagram of a malicious encrypted traffic detector 2000 in accordance with an embodiment of the present disclosure. The detector 2000 includes a profile image generator 2006 as a software, hardware, firmware or combination component for generating a profile matrix or image for a connection setup portion of malicious network traffic 2010 communicated between endpoints 2008 and 2012 where at least one of the endpoints is infected with malicious software such as malware. The profile image generator 2006 generates an image in which each pixel represents an evaluated value of entropy or Fourier transform coefficient for a single byte in the connection setup portion. In this way the image generated by the profile image generator 2006 is not the same as those depicted and described with respect to FIGS. 19a and 19b since there is no profiling in the image generated by the generator 2006. The profiling comes by way of the machine learning techniques based on multiple images as described below. An example method of the profile image generator is outlined by the following pseudo-code:

Generate new profile image, initializing each pixel;
For each byte in a connection setup portion of a current connection and for each pixel in the profile image:
Evaluate entropy/Fourier coefficient for current byte;
Encode the entropy/coefficient value in the current pixel in the profile image;
End;

The profile image generator 2006 is executed multiple times such that multiple profile images are generated. Each of the profile images generated by the profile image generator 2006 may be very similar or indeed identical if the environmental characteristics remain static. Such environmental characteristics include: an arrangement and number of the endpoints 2008, 2012; the nature of the network connecting the endpoints 2008, 2012; the configuration of the endpoints 2008, 2012 such as the operating systems, networking libraries, network facilities etc. employed and/or deployed therein; characteristics of the network such as network topology, intermediate entities such as routers, switches and the like, network medium or media such as wired, wireless, cellular and the like. Accordingly in some embodiments one or more of these characteristics is modified, such as by modifying one or more endpoints 2008, 2012 or the network there between, in order to elicit or at least admit variations in the nature, content and/or characteristics of the malicious network traffic and, in particular, the connection setup portion of the network traffic, so as to generate profile images that are not identical but that retain the typical characteristics of the connection setup portion so as to characterize the connection setup portion of the malicious network traffic. Thus the profile image generator 2006 generates multiple, preferably many, profile images.

Subsequently a machine learning algorithm 2004 as a software, hardware, firmware or combination component receives the multiple profile images and generates a learned profile 2002. In a preferred embodiment the machine learning algorithm 2004 is a supervised neural network algorithm that is trained by the profile images generated by the profile image generator such that the learned profile 2002 is a trained learning algorithm suitable for classifying, identifying or recognizing images. For example, deep belief networks can be used to form generative models of digital images for subsequent image recognition (see, for example, "A Fast Learning Algorithm for Deep Belief Nets", Hinton et al., Neural Computation 18, 1527-1554 (2006)). The use of restricted Boltzmann machines in forming image classifiers, image recognition and supervised learning algorithms that are capable of identifying, classifying or extracting recognized features in images is well documented. For example "To Recognize Shapes, First Learn to Generate Images" (Hinton, Department of Computer Science 6 King's College Rd, University of Toronto, 2006) describes how images composed of binary pixels can be modeled by using a "Restricted Boltzmann machine" (RBM) that uses a layer of binary feature detectors to model higher order correlations between pixels. Further, in "Deep Boltzmann Machines" (Salakhutdinov and Hinton, Proceedings of the 12th International Conference on Artificial Intelligence and Statistics (AISTATS) 2009, Clearwater Beach, Fla.) describes improvements to RBMs with pre-training for image classification. In "Modeling Pixel Means and Covariances Using Factorized Third-Order Boltzmann Machines" (Ranzato and Hinton, IEEE Conference on Computer Vision and Pattern Recognition, 2010) describes techniques for algorithms to learn a generative model of natural images for extracting features that capture interesting regularities. The paper "Using Very Deep Autoencoders for Content-Based Image Retrieval" (Krizhevsky and Hinton, European Symposium on Artificial Neural Networks—ESANN, 2011) describes how to learn many layers of features on color images and use these features to initialize deep autoencoders. Thus the learned profile 2002 can take the form of a taught supervised learning algorithm based on all the profile images generated by the profile image generator 2006. Accordingly the learned profile 2002, such as a deep belief network or a series of interconnected RBMs, can be used to recognize or classify input images based on the training set of profile images from the profile image generator 2006.

For example, in one embodiment the learned profile 2002 is a deep belief network comprised of a sequence of restricted Boltzmann machines (RBMs). Deep belief networks implemented in this manner are known in the art. Each RBM can be a probabilistic artificial neural network including visible units $v_1$ to $v_a$ and hidden units $h_1$ to $h_b$. Each visible unit is connected to each and every hidden unit via undirected connections. It is a feature of an RBM that hidden units are not connected to other hidden units and visible units are not connected to other visible units. Each of the visible and hidden units in an RBM has associated a state. A first RBM in the sequence has a set of visible units where each visible unit is adapted to store linear state information (e.g. state$\in \mathbb{N}$). The set of hidden units for the first RBM and the visible and hidden units of each subsequent RBM in the sequence are adapted to store binary state information.

Each of the connections between visible and hidden units in each RBM has associated a connection weight that is configurable as part of the teaching process. The visible and hidden units in each RBM have an activation function defining a state of the unit and being evaluated from the states of each connected unit and the weights associated with each corresponding connection. In the preferred embodiment the activation function is a sigmoid function. The sequence of RBMs of the learned profile 2002 is organized such that a state of each of the visible units of the first RBM is defined based on digital image data received during training of the learned profile 2002. Such digital image data is pixel information from a digital image as a bitmapped or rasterized image, such as the profile images generated by the profile image generator 2006. For each subsequent RBM in the sequence the evaluated state of hidden units of a preceding RBM form the input to the visible units of the subsequent RBM.

The sequence is configured by repeated training of each of the RBMs based on a training set of profile images. Subsequently, the learned profile 2002 is operable to generate, at a last RBM in the sequence, a binary code for an input image provided to a first RBM in the sequence. Each RBM is trained using contrastive divergence starting with random weights for each of the connections. In a first task, a state of hidden units is determined based on a state of connected visible units and corresponding connection weights by evaluation of an activation function. In a second task, the state of visible units is reconstructed from the determined state of hidden units following the first task. In a third task, the state of hidden units is recomputed from the reconstructed visible unit states. The connection weight for a connection between two units is then updated based on a difference between the states of the two units after the first and third tasks. Such training is repeated for each image and for the many images in the training set.

Figure 21:
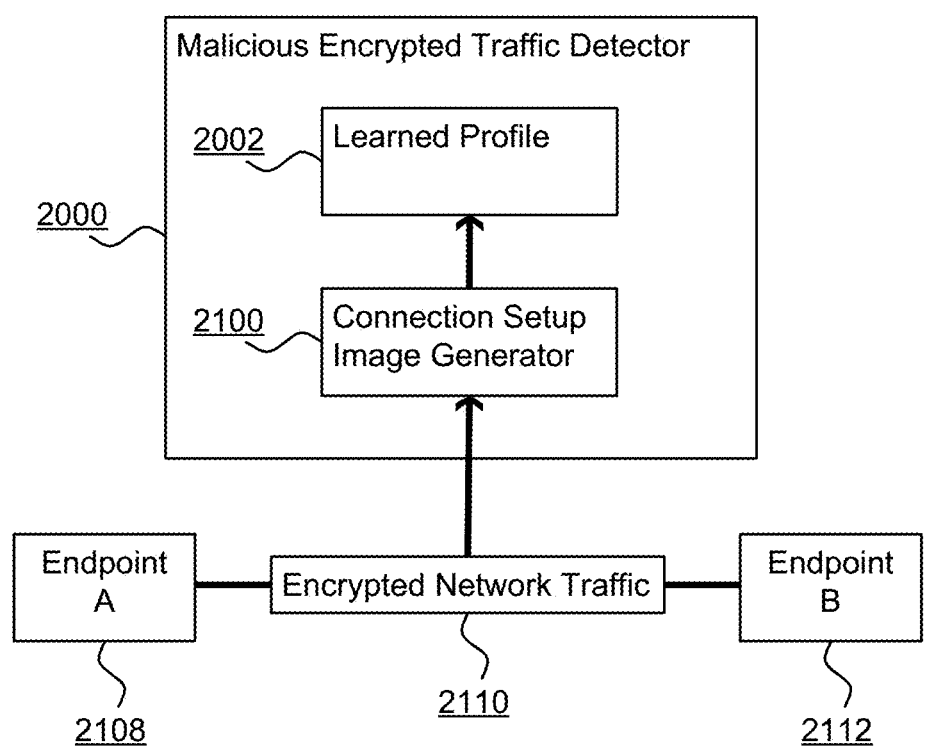
FIG. 21 is a component diagram of a malicious encrypted traffic detector in accordance with an embodiment of the present disclosure.

FIG. 21 is a component diagram of a malicious encrypted traffic detector 2000 in accordance with an embodiment of the present disclosure. In the arrangement of FIG. 21 the learned profile 2002 following training by the machine learning algorithm 2004 based on profile images generated by the profile image generator 2006 is operable to receive new images generated by a connection setup image generator 2100 from network traffic 2110 between network endpoints 2108, 2112 in order to identify network traffic that may be indicative of malicious network communications. The connection setup image generator 2100 generates a bitmapped or raster image based on a connection setup portion of a network connection having network traffic 2110. The method used by the connection setup image generator 2100 can be similar or identical to the profile image generator 2006 described above. In any even the images generated by the connection setup image generator 2100 and the profile image generator 2006 must have the same structure in order that they are comparable. The image generated by the connection setup image generator 2100 is then presented to the learned profile 2002 classifying machine to determine if the image matches the learned profile 2002. Where the image matches the learned profile 2002 the malicious encrypted traffic detector 2000 identifies the encrypted network traffic 2110 as potentially malicious and optionally undertakes one or more of the remediation or response actions for detected malicious traffic described previously.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The disclosure program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived there from. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for identifying malicious encrypted network traffic associated with a malware software component communicating via a network, the method comprising:
    defining, for the malware software component, a portion of network traffic including a plurality of contiguous bytes occurring at a predefined offset in a network communication of the malware software component;
    extracting the defined portion of network traffic for each of a plurality of disparate network connections for the malware software component;
    evaluating a metric for each byte in each extracted portion;
    representing each extracted portion in a matrix data structure as an image of pixels wherein each pixel corresponds to a byte of the extracted portion; and
    training a neural network based on the images for the extracted portions such that subsequent network traffic can be classified by the neural network to identify malicious network traffic associated with the malware software component based on an image generated to represent the defined portion of the subsequent network traffic.

2. The method of claim 1 wherein the metric is a Fourier transform coefficient.

3. The method of claim 1 wherein the metric is a measure of entropy as a measure of a degree of indeterminacy of bytes.

4. The method of claim 1 wherein the defined portion of network traffic is a subset of the network traffic subsequent to a transport protocol handshake and up to a predetermined endpoint.

5. The method of claim 4 wherein the predetermined endpoint is selected to correspond to an end of an application protocol connection setup portion of network traffic.

6. The method of claim 1 further comprising, in response to the identification of malicious network traffic, triggering a protective component to protect an endpoint of the network connections from the malicious encrypted network traffic.

7. The method of claim 6 wherein the protective component is operable to undertake one or more of:
    terminating the network connection;
    initiating a scan for malware installed at an endpoint computer system; and
    adapting a level of security of an endpoint computer system or network connections.

8. The method of claim 2 wherein the portion of network traffic is defined such that an evaluated set of Fourier transform coefficients for the portion of encrypted malicious network traffic for a malware network communication distinguishes the malware network communication from non-malware network communication.

9. The method of claim 1 wherein the network connections are provided via a transmission control protocol (TCP) connection, and the portion is defined to be a continuous subset of traffic occurring over the network connections subsequent to a TCP handshake portion and up to a point in a flow of network traffic on the network connections where the traffic is encrypted.

10. A system for identifying malicious encrypted network traffic associated with a malware software component communicating via a network, the system comprising:
    a memory and a processor, wherein the processor is adapted to:
        define, for the malware software component, a portion of network traffic including a plurality of contiguous bytes occurring at a predefined offset in a network communication of the malware software component;
        extract the defined portion of network traffic for each of a plurality of disparate network connections for the malware software component;
        evaluate a metric for each byte in each extracted portion;
        represent each extracted portion in a matrix data structure as an image of pixels
        wherein each pixel corresponds to a byte of the extracted portion; and
        train a neural network based on the images for the extracted portions such that subsequent network traffic can be classified by the neural network to identify malicious network traffic associated with the malware software component based on an image generated to represent the defined portion of the subsequent network traffic.

11. A non-transitory computer-readable storage medium storing a computer program element comprising computer program code to, when loaded into a computer system and executed thereon, cause the computer system to perform the method as claimed in claim 1.

* * * * *